(12) United States Patent
Okubo et al.

(10) Patent No.: US 9,538,375 B2
(45) Date of Patent: Jan. 3, 2017

(54) METHOD FOR CONFIGURING WIRELESS CONNECTION SETTINGS, WIRELESS COMMUNICATIONS APPARATUS, AND DISPLAY METHOD

(71) Applicant: Panasonic Intellectual Property Corporation of America, Torrance, CA (US)

(72) Inventors: Masafumi Okubo, Kyoto (JP); Hidetaka Oto, Osaka (JP); Keiichi Tanaka, Osaka (JP); Hiroo Ishikawa, Osaka (JP); Takao Adachi, Hyogo (JP); Kohei Yamaguchi, Kanagawa (JP); Yuji Kunitake, Kyoto (JP); Tomonori Nakamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/427,353

(22) PCT Filed: Jun. 26, 2014

(86) PCT No.: PCT/JP2014/003429
§ 371 (c)(1),
(2) Date: Mar. 11, 2015

(87) PCT Pub. No.: WO2015/001772
PCT Pub. Date: Jan. 8, 2015

(65) Prior Publication Data
US 2015/0271669 A1    Sep. 24, 2015

(30) Foreign Application Priority Data

Jul. 1, 2013 (JP) ................................. 2013-137786
Jul. 1, 2013 (JP) ................................. 2013-137787

(51) Int. Cl.
*G06F 21/30* (2013.01)
*H04W 12/06* (2009.01)
(Continued)

(52) U.S. Cl.
CPC .............. *H04W 12/06* (2013.01); *G06F 21/30* (2013.01); *G06F 21/44* (2013.01);
(Continued)

(58) Field of Classification Search
None
See application file for complete search history.

(56) References Cited

U.S. PATENT DOCUMENTS

2006/0153098 A1* 7/2006 Shimizu ............... H04B 7/0452
                                                            370/254
2007/0164878 A1* 7/2007 Baier ..................... G06F 3/014
                                                            341/20
(Continued)

FOREIGN PATENT DOCUMENTS

JP    2004-135181    4/2004
JP    2007-323339    12/2007
(Continued)

OTHER PUBLICATIONS

International Search Report (ISR) issued Sep. 16, 2014 in International (PCT) Application No. PCT/JP2014/003429.

*Primary Examiner* — David Le
(74) *Attorney, Agent, or Firm* — Wenderoth, Lind & Ponack, L.L.P.

(57) ABSTRACT

Provided is a method for configuring wireless connection settings, a wireless communications apparatus, and a display method, the method being executed by the wireless communications apparatus and including: (a) receiving a first radio signal which includes second configuration information; (b) receiving authentication information for use in
(Continued)

authenticating a first device from a second device, the authentication information being uniquely associated with the first device; (c) retaining the authentication information; (d) establishing the wireless connection with the first device, using the second configuration information; (e) transmitting a second radio signal which includes the authentication information, to the first device through the wireless connection established; (f) receiving a third radio signal which includes response information to the authentication information; and (g) transmitting the first configuration information to the first device if the response information indicates that the first device has been successfully authenticated.

17 Claims, 25 Drawing Sheets

(51) Int. Cl.
*H04L 29/06* (2006.01)
*H04W 76/02* (2009.01)
*G06F 21/44* (2013.01)
*H04W 84/12* (2009.01)

(52) U.S. Cl.
CPC ...... *H04L 63/0853* (2013.01); *H04L 63/0876* (2013.01); *H04W 76/02* (2013.01); *H04W 76/025* (2013.01); *H04W 84/12* (2013.01)

(56) References Cited

U.S. PATENT DOCUMENTS

| | | | |
|---|---|---|---|
| 2008/0243647 A1* | 10/2008 | Kurashima | G06Q 10/087 705/28 |
| 2008/0298305 A1 | 12/2008 | Nakamura | |
| 2012/0254614 A1 | 10/2012 | Kimura et al. | |
| 2015/0264666 A1* | 9/2015 | Yi | H04L 5/001 370/329 |

FOREIGN PATENT DOCUMENTS

| | | |
|---|---|---|
| JP | 2008-124810 | 5/2008 |
| JP | 2008-211507 | 11/2008 |
| JP | 2008-294919 | 12/2008 |
| JP | 2012-217044 | 11/2012 |

* cited by examiner

FIG. 23
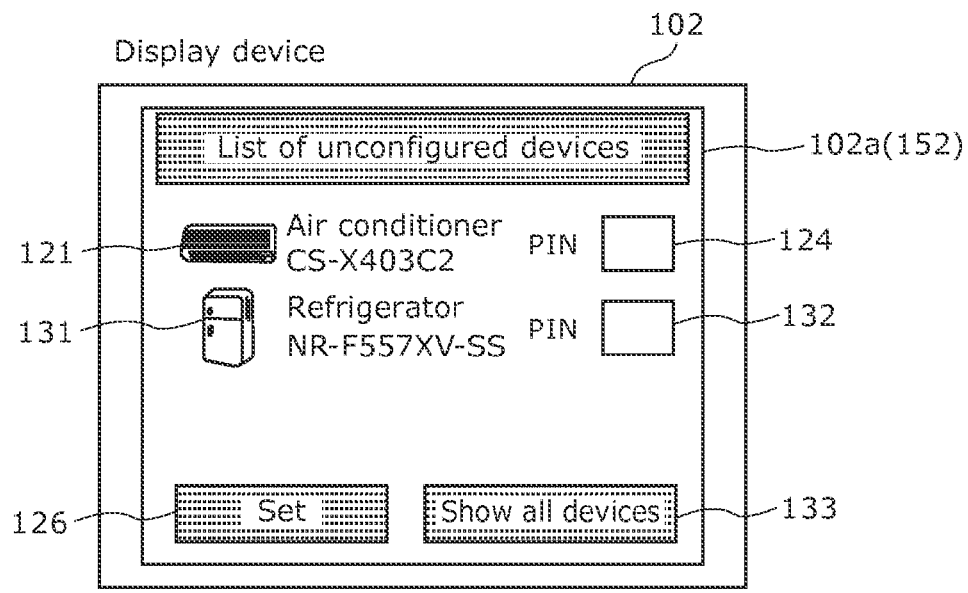
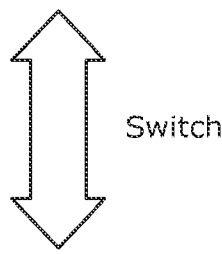
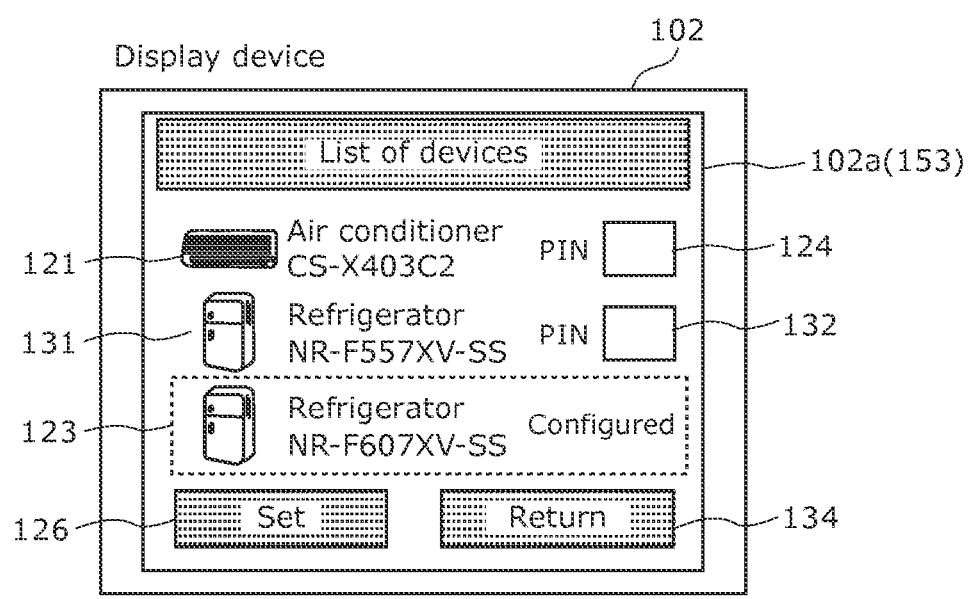

FIG. 24
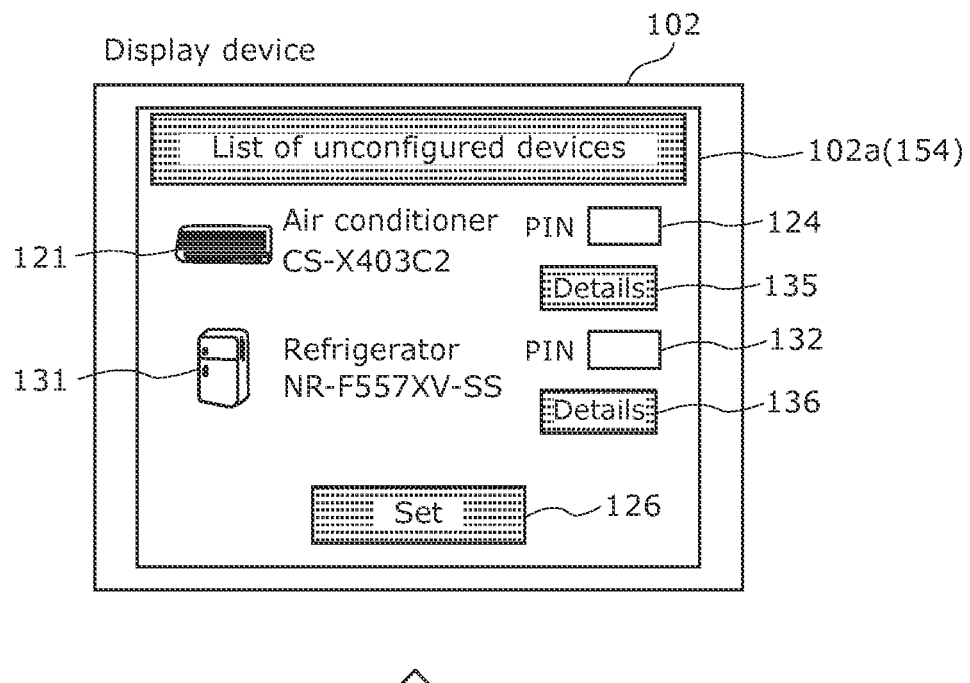
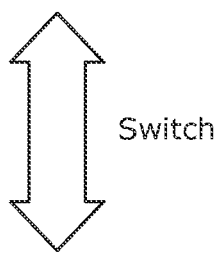
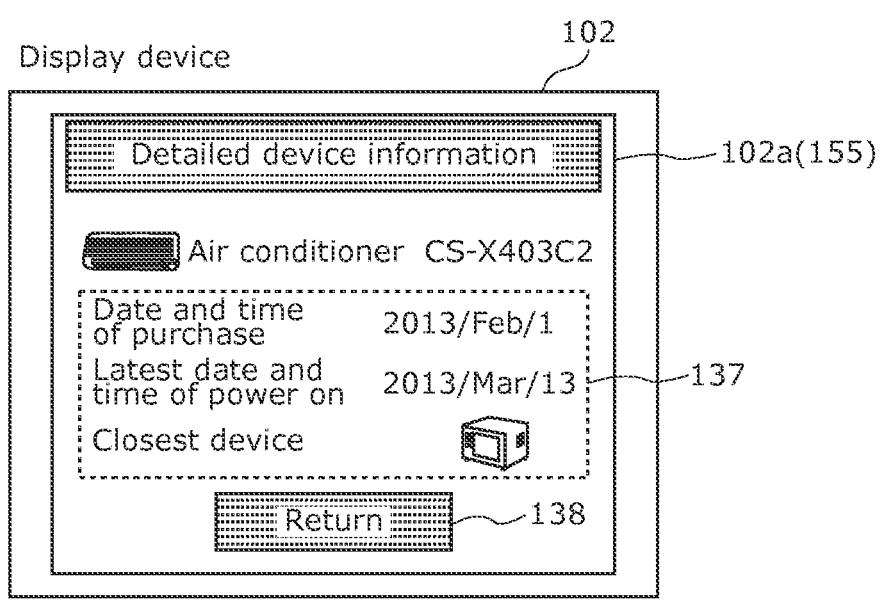

FIG. 28
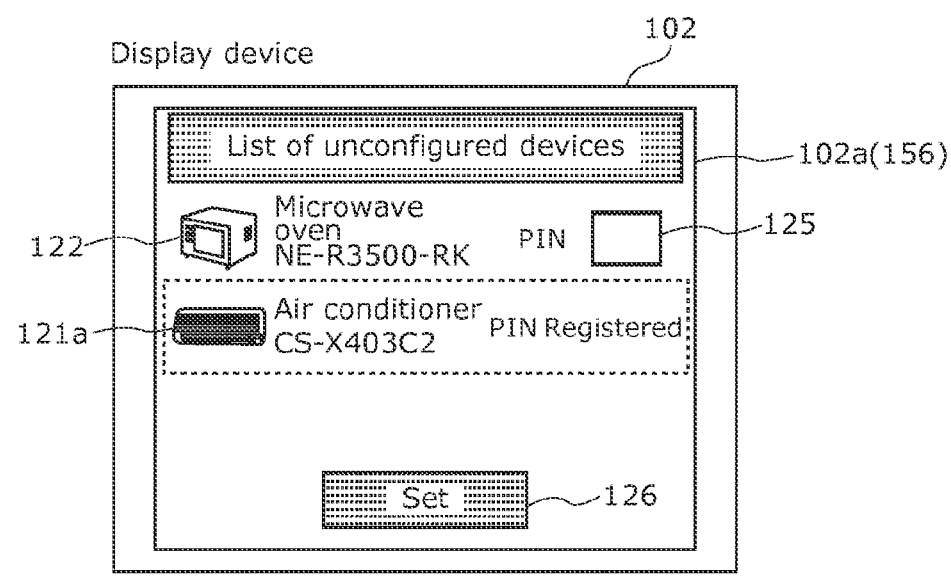
(a)
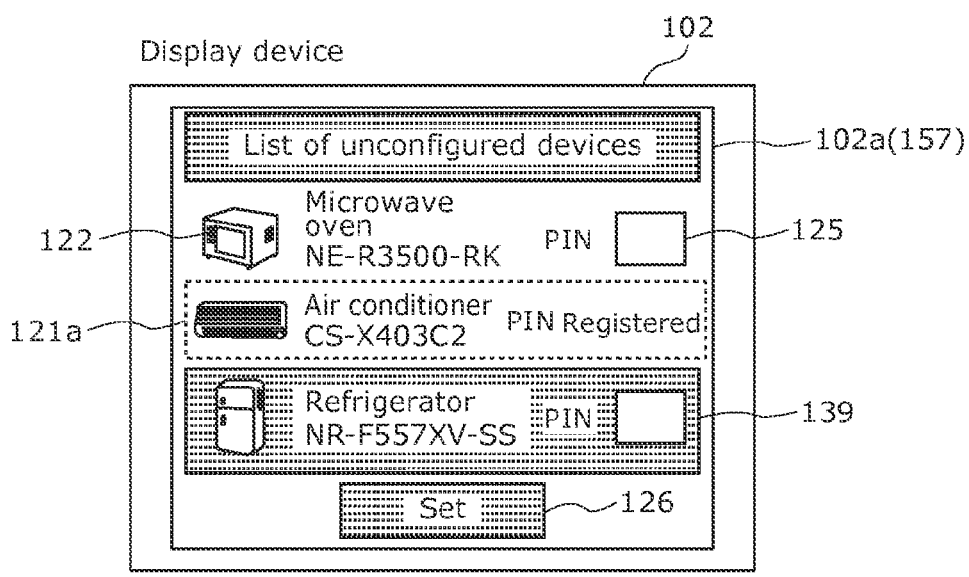
(b)

METHOD FOR CONFIGURING WIRELESS CONNECTION SETTINGS, WIRELESS COMMUNICATIONS APPARATUS, AND DISPLAY METHOD

TECHNICAL FIELD

The present invention relates to a method for configuring wireless connection settings, executed by a wireless communications apparatus equipped with wireless capabilities, the wireless communications apparatus, and a display method.

BACKGROUND ART

Conventionally, in order for a device (a wireless device) equipped with wireless communication capabilities to wirelessly connect to an access point (hereinafter, referred to as "AP.") of a wireless LAN, a service set identifier (SSID) and an encryption key of the AP (or a router incorporating the AP) need to be set to the wireless device. AirStation One-Touch Secure System (AOSS) and Wi-Fi Protected Setup (WPS) are known techniques to simplify the labor of configuring these settings (hereinafter, also referred to as set-up) (e.g., see Patent Literatures (PTLs) 1 and 2).

CITATION LIST

Patent Literature

[PTL 1] Japanese Unexamined Patent Application Publication No. 2012-217044
[PTL 2] Japanese Unexamined Patent Application Publication No. 2008-211507
[PTL 3] Japanese Unexamined Patent Application Publication No. 2008-294919

SUMMARY OF INVENTION

Technical Problem

These techniques, however, do not allow the wireless connection to be readily established.

To address the above problem, an object of the present invention is to provide a method for configuring wireless connection settings, a wireless communications apparatus, and a display method which allow the wireless connection settings between the wireless communications apparatus and a device to be readily configured.

Solution to Problem

To achieve the above object, a method for configuring wireless connection settings according to one aspect of the present invention is a method for configuring wireless connection settings, executed by a wireless communications apparatus to establish a wireless connection between a device and the wireless communications apparatus, the method including: (a) receiving a first radio signal transmitted from a first device which does not retain first configuration information for establishing a wireless connection with the wireless communications apparatus, the first radio signal including second configuration information for establishing a wireless connection with the first device; (b) receiving authentication information for use in authenticating the first device from a second device retaining the first configuration information, the authentication information being uniquely associated with the first device; (c) retaining the authentication information associated with the first device and received in step (b); (d) establishing the wireless connection with the first device, using the second configuration information included in the first radio signal received in step (a); (e) transmitting a second radio signal which includes the authentication information, to the first device through the wireless connection established in step (d); (f) receiving, from the first device through the wireless connection established in step (d), a third radio signal which includes response information to the authentication information included in the second radio signal transmitted in step (e); and (g) transmitting the first configuration information to the first device through the wireless connection established in step (d) if the response information indicates that the first device has been successfully authenticated.

These general and specific aspects may be implemented in an apparatus, a system, an integrated circuit, a computer program, or a computer-readable recording medium such as a CD-ROM, or any combination of systems, methods, integrated circuits, computer programs, and computer-readable recording media.

Advantageous Effects of Invention

The method for configuring wireless connection settings, the wireless communications apparatus, and the display method according to the present invention allow the wireless connection setting between the wireless communications apparatus and a device to be readily configured.

BRIEF DESCRIPTION OF DRAWINGS

FIG. 23 is a diagram showing an example of a UI at a time of PIN registration in the embodiment 4.

FIG. 24 is a diagram showing another example of the UI at the time of PIN registration in the embodiment 4.

FIG. 28 is a diagram showing another example of a UI screen at a time of PIN registration in the embodiment 5.

Figure 1:
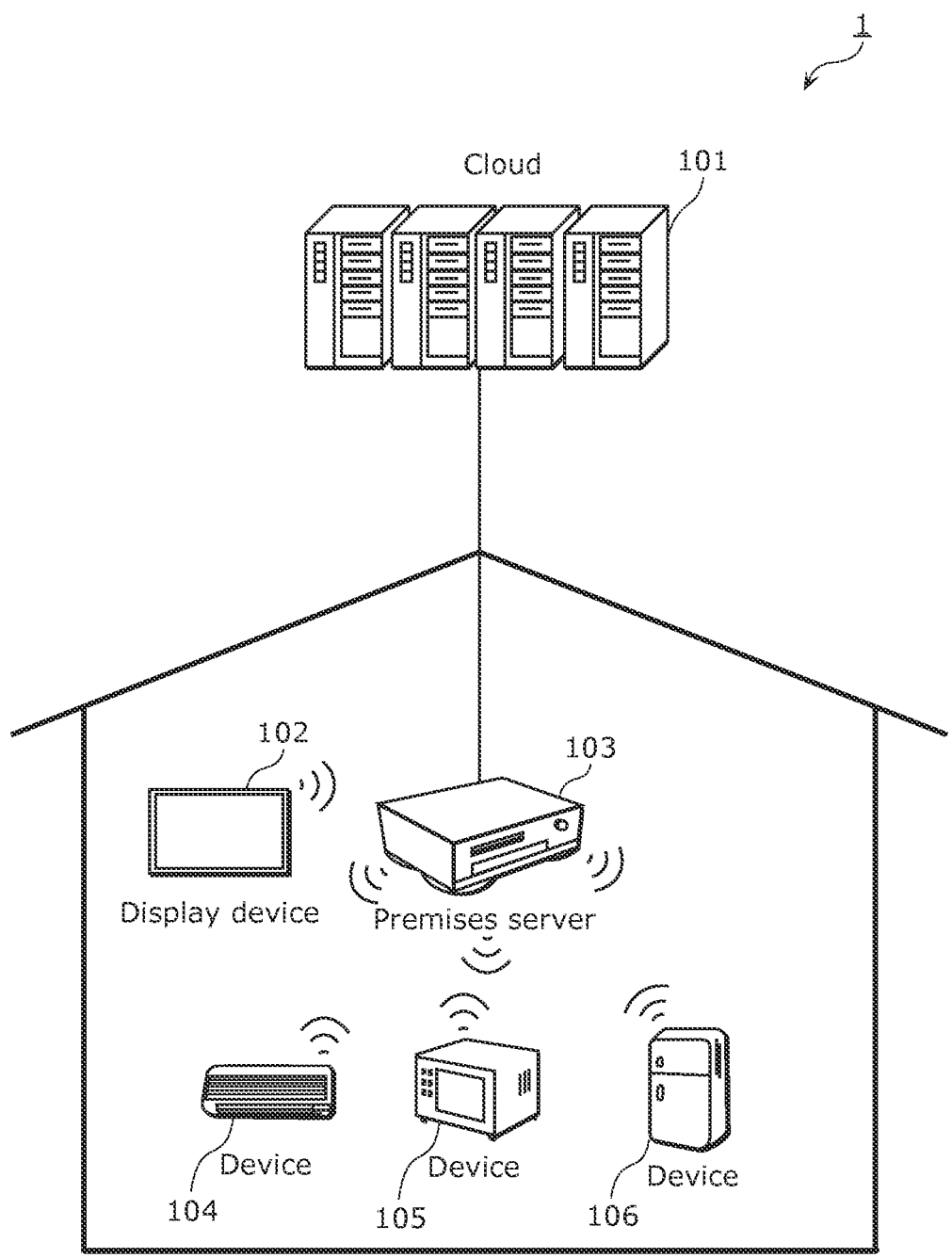
FIG. 1 is a diagram showing an example of use of a wireless connection set-up system.

DESCRIPTION OF EMBODIMENTS (Underlying Knowledge Forming Basis of the Present Invention)

In relation to the method for configuring the wireless connection settings described in the Background Art section, the inventors have found the following problems:

In AOSS, during the setup, depressing a button (not shown) mounted on the AP and a button of a wireless device, whose wireless connection settings with the AP is unconfigured, triggers exchange of encryption keys between the wireless device and the AP through unique cryptography to configure the wireless connection settings between the device and the AP and settings for the security. In the initial stage of the setup where the wireless device temporarily connects to the AP wirelessly, the AP transmits to the wireless device an SSID common to another AP, and the wireless device uses the SSID to configure the wireless connection settings with the AP and settings for the security.

The wireless device receives the SSID generated automatically and transmitted from the AP and sets up the SSID during the initial stage of the setup. The wireless device in normal operation uses the SSID to wirelessly connect to the AP for data communications.

In WPS, during setup, depressing a button (not shown) mounted on an AP and a button of a wireless device, whose wireless connection settings with the AP is unconfigured, or setting to the AP a personal identification number (PIN) code of the unconfigured wireless device allows the device to receive an SSID generated automatically by the AP and a encryption key from the AP and set the SSID and encryption key. The wireless device in normal operation uses the SSID and the encryption key to wirelessly connect to the AP for data communications.

The technique disclosed in PTL 1 causes a computer to execute processing of: adding an identifier, for use in identifying an apparatus, to a first access point identifier used by a device for normal operation as an AP for wireless communications, to generate a second access point identifier; and, when the device receives a request for searching an AP from an information communications device which performs station (Hereinafter, referred to as "STA.") functionality, transmitting the second access point identifier in response to the request.

The technique disclosed in PTL 2 includes an output apparatus including: a first wireless communications unit which stores connection information shared among apparatuses which perform wireless communications, and performs wireless communications based on the connection information; a first control unit which converts the connection information into a connection information pattern in an audio form and/or an image form; and an output unit which outputs the connection information pattern, and an input apparatus including: an input unit which inputs an audio and/or an image; a second control unit which parses input audio and/or input image, and if it is determined that the input audio and/or input image may be the connection information pattern, reconverts the connection information pattern into a connection information candidate; and a second wireless communications unit which attempts to perform wireless communications based on the connection information candidate.

The technique assumes that a destination device that a device wants to configure connection settings to is powered on or a radio resource of the destination device that the device wants to configure connection settings to is available. Thus, the technique has a problem that the connection settings may not be configured when an unconfigured destination device is not powered on or when a user of the destination device is using a service making use of wireless capabilities (e.g., wirelessly viewing recorded content in a room a different from one where the content was recorded).

The technique also assumes that the user is required to operate input means of an unconfigured device at a time of configuration of the connection settings if the unconfigured device has insufficient display capabilities or input capabilities (such as a white goods). This requires input operation on the unconfigured device every time the user purchases a device, which may impose a burden on the user.

To solve such problems, a method for configuring wireless connection settings according to one aspect of the present invention is a method for configuring wireless connection settings, executed by a wireless communications apparatus to establish a wireless connection between a device and the wireless communications apparatus, the method including: (a) receiving a first radio signal transmitted from a first device which does not retain first configuration information for establishing a wireless connection with the wireless communications apparatus, the first radio signal including second configuration information for establishing a wireless connection with the first device; (b) receiving authentication information for use in authenticating the first device from a second device retaining the first configuration information, the authentication information being uniquely associated with the first device; (c) retaining the authentication information associated with the first device and received in step (b); (d) establishing the wireless connection with the first device, using the second configuration information included in the first radio signal received in step (a); (e) transmitting a second radio signal which includes the authentication information, to the first device through the wireless connection established in step (d); (f) receiving, from the first device through the wireless connection established in step (d), a third radio signal which includes response information to the authentication information included in the second radio signal transmitted in step (e); and (g) transmitting the first configuration information to the first device through the wireless connection established in step (d) if the response information indicates that the first device has been successfully authenticated.

According to the above configuration, the wireless communications apparatus can obtain and retain the authentication information for use in authenticating the first device from the second device different from the first device. This allows authenticated connection between the wireless communications apparatus and the first device, without direct input of the authentication information from the first device, when the first device is, for example, a device (e.g., white goods) that does not include a sufficient input means. This allows wireless connection settings to be readily configured between the wireless communications apparatus and the first device.

For example, the wireless communications apparatus may retain the first configuration information, and third configuration information for establishing the wireless connection with the wireless communications apparatus by a second wireless communications method different from a first wireless communications method for use in establishing the wireless connection with the wireless communications apparatus using the first configuration information, the method further including (h) identifying, from among the first wireless communications method and the second wireless communications method, a wireless communications method used for the first radio signal received from the first device, wherein in step (d), the wireless connection with the first device may be established by the wireless communications method identified in step (h), in step (e), the second radio signal may be transmitted to the first device by the wireless communications method identified in step (h), and in step (g), one of the first configuration information and the third configuration information that corresponds to the wireless communications method identified in step (h) may be transmitted to the first device if the response information indicates that the first device has been successfully authenticated.

For example, if the response information indicates that the first device has been successfully authenticated, among plural pieces of the first configuration information retained by the wireless communications apparatus, first configuration information that corresponds to the wireless communications method identified in step (h) and is identical in content to first configuration information retained by a host wireless communications apparatus of the wireless communications apparatus may be transmitted to the first device.

For example, the second device may include an input unit configured to receive input including the authentication information from a user, and a display unit, and in step (b), the authentication information included in the input received by the input unit may be received.

For example, the method may further include (i) transmitting, to the second device, display information for displaying a user interface (UI) screen on the display unit of the second device, wherein the authentication information may be input via the UI screen displayed on the display unit of the second device.

For example, the first radio signal received in step (a) may further include device specific information identifying the first device, the method further including: (j) obtaining relevant information related to the device specific information from a server; and (k) retaining the device specific information and the relevant information obtained in step (j) in the wireless communications apparatus, wherein in step (i), information including the device specific information and the relevant information may be transmitted as the display information to the second device.

For example, step (b) may further include receiving time information related to a scheduled time at which the first device is to be authenticated, and in step (d), based on the time information, the wireless connection with the first device may be established using the second configuration information provided by the first device and corresponding to the time information.

For example, the method may further include (I) detecting whether the first device is wirelessly connecting to the wireless communications apparatus using the first configuration information provided by the wireless communications apparatus, wherein if the first device is detected to not be wirelessly connecting to the wireless communications apparatus using the first configuration information in step (I), the wireless communications apparatus may switch to a state where the wireless communications apparatus is allowed to wirelessly connect to the first device using the first configuration information provided by the first device.

For example, step (a) may further include receiving a fourth radio signal from a third device which is in a home and retains the first configuration information, wherein if input is made, via the UI screen, to request for information which is an indication for determining whether the first device is located inside or outside the home while the UI screen is being displayed on the display unit of the second device, a UI screen which includes information on the third device satisfying predetermined conditions may be displayed on the display unit of the second device.

For example, the wireless communications apparatus may retain information on the third device and information on the first device, the information on the third device and the information on the first device may include model information of the third device and model information of the first device, respectively, and the predetermined conditions may include the third device being of a same model as the first device.

For example, the wireless communications apparatus may retain information on the third device and information on the first device, the information on the third device and the information on the first device may include information on field strength of a radio signal transmitted from the third device and information on field strength of a radio signal transmitted from the first device, respectively, and the predetermined conditions may include the third device having field strength comparable to field strength of the first radio signal transmitted from the first device.

For example, the method may further include (m) determining whether the first device is located inside or outside a home, wherein in step (i), information for displaying information on the first device determined to be located outside the home in step (m) differently from the first device determined to be located inside the home in step (m), may be transmitted as the display information.

For example, in step (m), the first device may be determined to be located inside the home if the first device retains authentication information corresponding to the wireless communications apparatus.

For example, in step (m), the first device may be determined to be located inside the home if a model of the first device is different from a model of the third device.

For example, in step (m), the first device may be determined to be located inside the home if a time slot during which the first device is being powered on is similar to a time slot during which the third device is being powered on.

For example, in step (m), the first device may be determined to be located inside the home if a predetermined time period has not elapsed since the first device is powered on.

Moreover, for example, a wireless communications apparatus according to one aspect of the present invention may be implemented in a wireless communications apparatus including: a first reception unit configured to receive a first radio signal transmitted from a first device which does not retain first configuration information for establishing a wireless connection with the wireless communications apparatus, the first radio signal including second configuration information for establishing a wireless connection with the first device; a second reception unit configured to receive authentication information for use in authenticating the first device from a second device retaining the first configuration information, the authentication information being uniquely associated with the first device; a retaining unit configured to retain the authentication information associated with the first device and received by the second reception unit; an establishment unit configured to establish the wireless connection with the first device, using the second configuration information included in the first radio signal received by the first reception unit; a first transmission unit configured to transmit a second radio signal which includes the authentication information, to the first device through the wireless connection established by the establishment unit; a third reception unit configured to receive, from the first device through the wireless connection established by the establishment unit, a third radio signal which includes response information to the authentication information included in the second radio signal transmitted by the first transmission unit; and a configuration information transmission unit configured to transmit the first configuration information to the first device through the wireless connection established by the establishment unit if the response information indicates that the first device has been successfully authenticated.

For example, a display method according to one aspect of the present invention may be implemented in a display method for an input screen for entry of authentication information, the display method including: (a) establishing a wireless connection with a wireless communications apparatus using first configuration information for establishing the wireless connection with the wireless communications apparatus; (b) receiving UI information from the wireless communications apparatus by requesting for the UI information for use in displaying a UI screen for entry of authentication information which is uniquely associated with a first device and for use in authenticating the first device which does not retain the first configuration information; (c) displaying the UI screen based on the UI information received in step (b); and (d) transmitting the authentication information input via the UI screen, wherein in step (c), if a request is received which is made for information which is an indication for determining whether the first device is located inside or outside a home while the UI screen is being displayed, a UI screen is displayed which includes information on a third device that satisfies predetermined conditions among third devices retaining the first configuration information.

These general and specific aspects may be implemented in a system, a method, an integrated circuit, a computer program, or a computer-readable recording medium such as a CD-ROM, or any combination of systems, the methods, integrated circuits, computer programs, or computer-readable recording media.

Hereinafter, a method for configuring wireless connection settings, a wireless communications apparatus, and a display method according to one aspect of the present invention will be described, with reference to the accompanying drawings.

It should be noted that embodiments described below are each merely a general and specific example of the present invention. Values, shapes, materials, components, arrangement and connection between the components, steps, and the order of the steps are merely illustrative, and are not intended to limit the present invention. Moreover, among components of the embodiments below, components not set forth in the independent claims indicating the top level concept of the present invention will be described as optional components.

(Embodiment 1)

First, use of a wireless connection set-up system according to one aspect of the present invention will be described.

FIG. 1 is a diagram showing an example of use of the wireless connection set-up system according to the present invention.

A wireless connection set-up system 1 includes an out-of-home server 101 (will be referred to as a cloud 101), a display device 102, a premises server 103, and devices 104, 105, and 106.

The out-of-home server 101 (will be referred to as the cloud 101) provides a user with Internet services via, for example, an out-of-home network. Examples of the out-of-home network include one or both of a wired network and a wireless network.

The display device 102 is a second device already wirelessly connected to the premises server 103 via a home network (not shown). The home network (not shown) between the display device 102 and the premises server 103 may be a wired network or may be a wireless network. In the following the home network will refer to a network which is provided by the premises server 103. The display device 102 includes a touch panel 102a which has functionality of both a display unit which displays an image, and an input unit which receives input with respect to the displayed image. It should be noted that the display device 102 may not employ the touch panel 102a having the functionality of both the display unit and the input unit. The input unit may be, for example, a physical input button or may be an input apparatus such as a keyboard and a mouse.

The premises server 103 is by way of example of a wireless communications apparatus (Hereinafter, referred to as a "parent device.") corresponding to a parent device in wireless communications. The parent device is not necessarily limited to the premises server 103 and may be a relay or a router device, for example.

The display device 102 instructs the premises server 103 to control the devices 104, 105, and 106 which are by way of example of wireless communications apparatus (Hereinafter, referred to as "child devices.") corresponding to child devices of the premises server 103. The device 106 is already wirelessly connected to the premises server 103 via the home network by a predetermined wireless communications method. The devices 104 and 105 are about to prompt to newly connect wirelessly to the home network provided by the premises server 103, using predetermined wireless communications methods. Examples of the wireless communications method for use for the home network provided by the premises server 103 include Wireless Fidelity (WiFi), Zigbee (registered trademark), and specified low power radio. The premises server 103 can provide the home network by a first wireless communications method and a second wireless communications method different from the first wireless communications method. In other words, the premises server 103 can use different wireless communications methods to provide the home network. One of the wireless communications methods used by the premises server 103 is the same as that used by the premises server 103 and the devices 104 and 105 in transmitting beacon signals.

The devices 104, 105, and 106 shown in FIG. 1 are an air conditioner, a microwave oven, and a refrigerator, respectively. Three white goods present in the user's home are by way of examples of the devices 104, 105, and 106. The devices 104, 105, and 106 may be of any type or any number, insofar as they are equipped with wireless capabilities.

Figure 2:
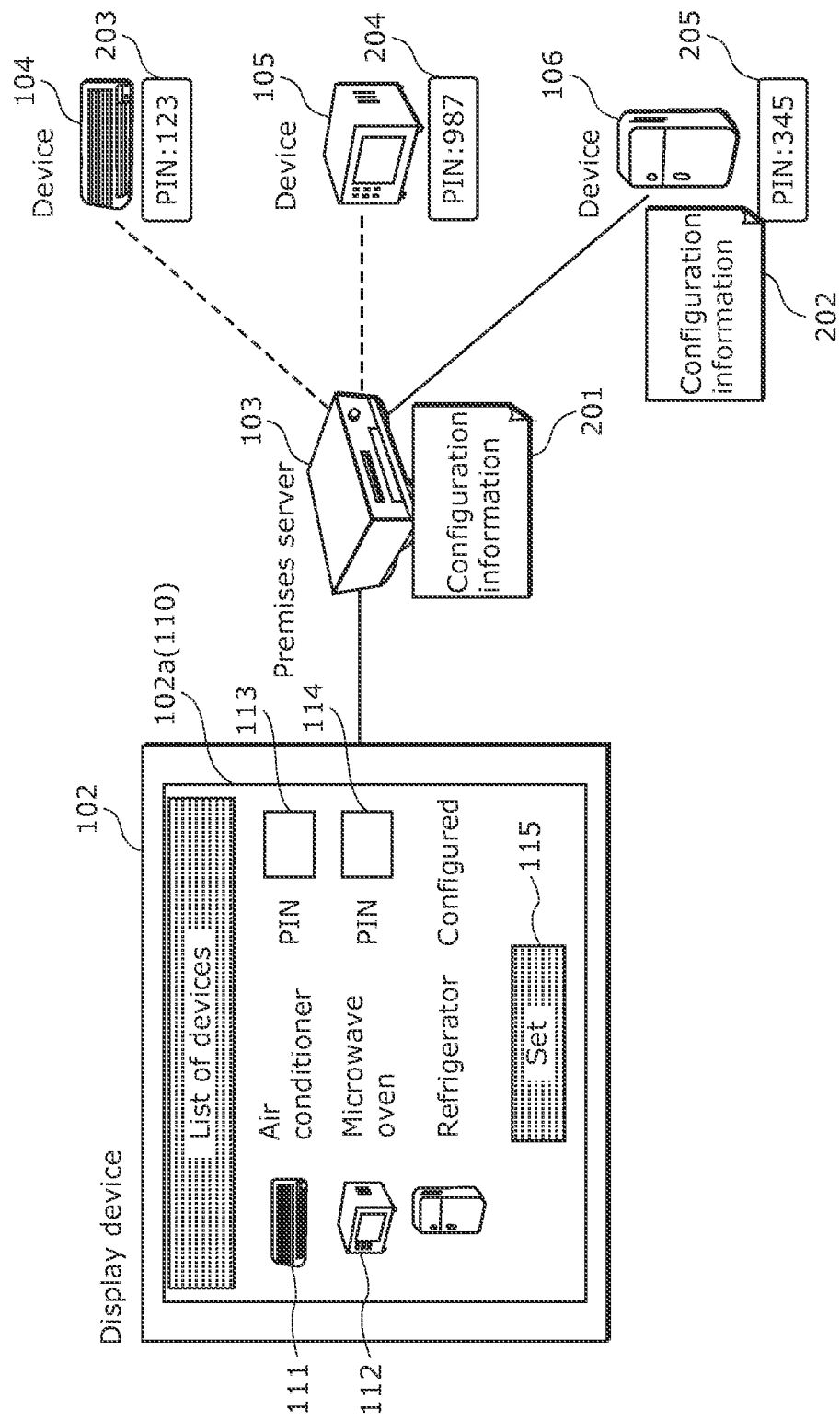
FIG. 2 is a diagram showing an example of connection set-up according to an embodiment 1.

FIG. 2 is a diagram showing an example where the devices 104 and 105 whose connection settings to the home wireless network provided by the premises server 103 are not configured yet (also, referred to as unconfigured), and authentication information for authenticating the devices 104 and 105 are to be input via a user interface (Hereinafter, referred to as a "UI.") screen 110 displayed on the touch panel 102a of the display device 102.

To display the UI screen 110 on the display device 102, the premises server 103, beforehand, generates display information for displaying the UI screen 110 on the touch panel 102a of the display device 102 and transmits the generated display information to the display device 102. In this example, the touch panel 102a of the display device 102 shows information on the devices 104, 105, and 106 in a list of the devices which is obtained from the premises server 103. The connection settings of the premises server 103 is configured by, for example, WPS, and the premises server 103 holds configuration information 201 for wirelessly connecting to the premises server 103 by WPS, for example. The device 104 holds a PIN code 203 which is authentication information for authenticating the device 104. The device 105 holds a PIN code 204 which is authentication information for authenticating the device 105. The device 106 holds a PIN code 205 which is authentication information for authenticating the device 106.

The premises server 103 retains the configuration information 201 for wireless connection with the home wireless network the premises server 103 provides. The configuration information includes, for example, network IDs of the home network that correspond to the wireless communications methods. For example, consider the case where the premises server 103 supports the wireless communications methods which are, WiFi, specified low power radio, and Zigbee (registered trademark).

In this case, the premises server 103 retains configuration information which includes a network ID of the home network when WiFi is used, configuration information which includes a network ID of the home network when specified low power radio is used, and configuration information which includes a network ID of the home network when Zigbee (registered trademark) is used. In other words, the premises server 103 retains a plurality of different pieces of configuration information corresponding to different wireless communications methods.

At this time, if the configuration information includes a plurality of passwords corresponding to a plurality of network IDs, encrypted communication using a password is also allowed to perform wireless communications via a home network corresponding to a network ID associated with the password.

The network ID of the home network when WiFi is used is also known as a service set identifier (SSID).

The network ID of the home network when specified low power radio or Zigbee (registered trademark) is used is also known as PANID.

To connect to the device 106 via the home wireless communications network, for example, the premises server 103 copies the configuration information 201 corresponding to a wireless communications method to be used by the device 106, and allows the device 106 to retain configuration information 202 obtained by copying the configuration information 201. In doing so the premises server 103 and the device 106 retain the configuration information that has the same network ID.

The device 106 is assigned an IP address on the home wireless communication network corresponding to the network ID included in the configuration information 202, providing the device 106 with communications under an IP protocol on the home network.

In the example shown in FIG. 2, the device 106 has completed the configuration of the connection settings for wirelessly connecting with the premises server 103 by a predetermined wireless communications method such as WPS and is holding the configuration information 202 corresponding to the wireless communications method.

The premises server 103 can transmit beacon signals through wireless communications. The beacon signal transmitted from the premises server 103 includes, for example, a MAC address uniquely assigned to the premises server 103.

The unconfigured devices 104 and 105 each receive a beacon signal from the premises server 103 and retain a media access control (MAC) address of the premises server 103 included in the received beacon signal.

The devices 104 and 105 have not yet been configured the connection settings to the home wireless communications network provided by the premises server 103. Thus, the devices 104 and 105 are not assigned IP addresses on the home wireless communication network corresponding to the network IDs included in the configuration information previously retained by the premises server 103.

The devices 104 and 105, however, can use the wireless communications to periodically transmit beacon signals. For example, a beacon signal transmitted from the device 104 includes a MAC address which is address information uniquely assigned to the device 104, the product number information of the device 104 (or information indicating the product number of the device 104), and the configuration information for wirelessly connecting with the device 104. It should be noted that the product number information of the device 104 included in the beacon signal may not be the product number information, insofar as the information is device specific information identifying the device 104, such as a vendor, a model number, a product type, date of manufacture, place of manufacture, or a combination thereof.

For example, a beacon signal transmitted from the device 105 includes a MAC address which is address information uniquely assigned to the device 105, information on the product number of the device 105, and the configuration information for wirelessly connecting with the device 105.

If the premises server 103 is present within a range of the beacon signals transmitted through the wireless communications, the premises server 103 can recognize that the unconfigured devices 104 and 105 are present within a range where the wireless communication with the premises server 103 is allowed.

The premises server 103 receives the beacon signals transmitted from the unconfigured devices 104 and 105, for example. Then, the premises server 103 determines a type of the wireless communications used for each beacon signal received, and retains the MAC address, the product number information, and the configuration information included in the beacon signal, in wireless mode management information and device management information described below.

In other words, the premises server 103 receives the beacon signal (a first radio signal) which includes second configuration information for wirelessly connecting with the device 104 (or the device 105), from the device 104 (or the device 105) which is a first device that does not retain first configuration information for wirelessly connecting with the premises server 103. The premises server 103 then identifies a wireless communications method used for the beacon signal (the first radio signal) received from the device 104 (or the device 105), from among the first wireless communications method and the second wireless communications method.

At this time, for example, date and time at which the premises server 103 first receives a beacon signal from each of the unconfigured devices 104 and 105 may be retained as date and time of purchase of the device. This is because a user who purchases a device is expected to be likely to power ON the device on the day of purchase.

At this time, while the premises server 103 is periodically receiving beacon signals from the unconfigured devices 104 and 105, the premises server 103 may generate information indicating that a corresponding device is powered ON, and retain the information in the beacon signals. If the premises server 103 does not receive a beacon signal from each of the unconfigured devices 104 and 105 in a period of time after the receipt of the last beacon signal, the premises server 103 may generate information indicating that the device corresponding to the beacon signal is powered OFF, and retain the information in device management information. In other words, depending on whether the premises server 103 is periodically receiving beacon signals from each of the unconfigured devices 104 and 105 or the premises server 103 is not receiving a beacon signal, the premises server 103 may generate ON information or OFF information indicating ON or OFF state of the power of the device corresponding to the beacon signal, and retain the generated ON information or the OFF information in the device management information.

Moreover, the premises server 103 asks, for example, the cloud 101 to conduct a search using the information indicating the product numbers, included in the beacon signals received from the devices 104 and 105. Upon receipt of the information indicating a product number of a device, for example, the cloud 101 searches a device type corresponding to the product number, the relevant information corresponding to the device, etc., and transmits a search result to the premises server 103. In other words, the premises server 103 obtains from the cloud 101 (a server) relevant information related to information indicating a product number (the device specific information).

Examples of the relevant information corresponding to a device include URL indicating a storage location where icon information indicating the device is stored, and icon information.

The premises server 103 associates the received device type and relevant information corresponding to the device with the product number and retains the association as UI data information.

This allows the premises server 103 to obtain the relevant information related to the product numbers of the unconfigured devices 104 and 105 from the cloud 101.

Then, the premises server 103 and the unconfigured devices 104 and 105 perform wireless communications using their MAC addresses and the configuration information provided from the unconfigured devices 104 and 105 until the unconfigured devices 104 and 105 complete the wireless connection with the home wireless communications network provided by the premises server 103.

The premises server 103 operates in a configuration mode and a normal mode. The configuration mode is for configuring the connection settings of the unconfigured devices 104 and 105. The normal mode is for performing wireless communications using the home network and the configuration information provided by the premises server 103. The premises server 103 operating in the configuration mode uses the configuration information transmitted from the device 104 to wirelessly communicate with the unconfigured device 104.

The display device 102 issues, to the premises server 103 via the home network provided by the premises server 103, a request for obtaining the UI screen 110 for displaying a list of configured devices and unconfigured devices. The premises server 103 receives the request and transmits, as the display information, information which includes product numbers (the device specific information) of the configured devices and the unconfigured devices and the relevant information to the display device 102. The display device 102, thereafter, displays the list of devices whose connection settings have been configured, and unconfigured devices on the touch panel 102a of the display device 102, according to the display information received from the premises server 103.

The UI screen 110 displayed on the touch panel 102a of the display device 102 shows, as shown in FIG. 2, icons 111 and 112 respectively indicating the unconfigured devices 104 and 105, and entry fields 113 and 114 for entering PIN codes on the sides of the icons 111 and 112. When the user enters PIN codes on the touch panel 102a of the display device 102 and depresses an input button 115 "Set," the display device 102 transmits the input PIN codes to the premises server 103. This allows the premises server 103 to receive the PIN codes (the authentication information) to be used for authenticating the unconfigured devices 104 and 105 from the display device 102. PIN codes are information assigned different values for different devices, for example. PIN code is pre-stored in a storage such as a memory or a hard disk of a device. The PIN code is provided, for example, in warranty or the like accompanied upon purchase of the device, and a purchaser refers to the warranty when entering the PIN code. In other words, the authentication information (the PIN codes) of the devices 104, 105, and 106 are information uniquely associated with the respective devices 104, 105, and 106. Since the authentication information only needs to identify the device, the authentication information is not limited to PIN code and may be QR code (registered trademark), a barcode, or an image.

For example, consider the case where a PIN code is entered in the entry field 113 for entering the PIN code of the device 104 corresponding to the air conditioner and the input button 115, "Set," is depressed on the UI screen 110 of the display device 102.

The premises server 103 receives the PIN code of the device 104 corresponding to the air conditioner from the display device 102 and retains the received PIN code in association with information corresponding to the device 104 in the device management information.

The premises server 103 authenticates a device at a predetermined time. The premises server 103 may authenticate a device, which is an authentication target, when the premises server 103, after retaining the PIN code in the device management information, has detected that the target device is powered ON.

Alternatively, the premises server 103 may authenticate a device, which is an authentication target, upon arrival of a scheduled time which is entered together with the PIN code at a time of entry of the PIN code. In this case, an entry field for entering the scheduled time for authentication is displayed as the UI screen 110 on the touch panel 102*a* of the display device 102, together with the entry field of the PIN code. The information entered in these entry fields are transmitted to the premises server 103. Then, the premises server 103 uses the receive information to authenticate the device by the PIN code included in the information upon arrival of the scheduled time included in the information.

Alternatively, the premises server 103 may authenticate a device, which is an authentication target, when it is determined that the target device is not communicating with a device configured using the configuration information provided by the wireless communications apparatus (i.e., the premises server 103).

Prior to authenticating the device, which is the authentication target, the premises server 103 retrieves the configuration information for wireless communications which is provided by the device to be authenticated, from the beacon signal transmitted from the device. Then, the premises server 103 uses the configuration information to communicate with the target device to authenticate the target device. This carries out the wireless communications between the premises server 103 and the device to be authenticated (the device 104 in this example), thereby allowing the premises server 103 to transmit the authentication information to the device to be authenticated.

The premises server 103 authenticates the unconfigured device 104 by PIN code. In this case, the premises server 103 uses the wireless communications method identified from the beacon signal received from the device 104 to transmit to the device 104 a beacon signal (a second radio signal) which includes a PIN code, corresponding to the device 104, received from the display device 102. The premises server 103 uses the MAC address corresponding to the device 104 to transmit the beacon signal to the device 104.

The device 104 determines whether the PIN code included in the beacon signal sent from the premises server 103 and the PIN code that is the authentication information the device 104 retains match. If the received PIN code and the PIN code the device 104 retains as the authentication information match, the device 104 transmits to the premises server 103 response information indicating that the authentication was successful in a beacon signal (a third radio signal). If the received PIN code and the PIN code the device 104 retains as the authentication information do not match, the device 104 transmits to the premises server 103 response information indicating that the authentication failed in the beacon signal (the third radio signal). At this time, the device 104 uses the MAC address corresponding to the premises server 103 to transmit the beacon signal (the third radio signal) to the premises server 103.

In this manner, the premises server 103 receives from the device 104 the beacon signal (the third radio signal) which includes the response information to the PIN code (the authentication information) included in the beacon signal (the second radio signal). If the beacon signal transmitted from the device 104 includes the response information indicating that the PIN code authentication was successful, the premises server 103 copies, among the pieces of configuration information the premises server 103 provides, the configuration information 201 corresponding to the wireless communications method used for the radio signal received from the device 104, and transmits the configuration information 202 obtained by copying the configuration information 201 in a beacon signal to the device 104 that has been successfully authenticated. In other words, if the response information indicates that the device 104 has been successfully authenticated, the premises server 103 transmits to the device 104 the configuration information corresponding to the wireless communications method that is the same wireless communications method as that used for the radio signal received from the device 104, among a plurality of pieces of configuration information corresponding to the plurality of wireless communications methods the premises server 103 retains. The device 104 retains, as the configuration information 202, the information obtained by copying the configuration information 201.

The premises serves 103, thereafter, switches the wireless connection established using the configuration information provided by the authenticated device 104, to wireless connection established using configuration information that corresponds to the type of the radio signal received from the device 104 among the plurality of pieces of configuration information the premises server 103 provides, and performs wireless communications with the device 104.

The unconfigured device 104 uses the configuration information 202 to establish wireless connection to the home wireless network provided by the premises server 103. At this time, the device 104 is given an IP address which is used over the home wireless network. The device 104 can obtain the IP address information of the premises server 103 being connected to the home wireless network. The device 104, having established the wireless connection to the home wireless network, uses the given IP address to perform communications over the home wireless network.

The foregoing has been described, with reference to the case where the PIN code is entered into the entry field 113 for entering the PIN code corresponding to the air conditioner and the input button 115, "Set," is depressed. The same applies to a case where a PIN code is entered into the entry field 114 for entering a PIN code corresponding to the microwave oven and the input button 115, "Set," is depressed, given that the foregoing may be read in terms of the device 105, rather than the device 104, since the device 105 corresponds to the microwave oven.

(Configuration of Wireless Connection Set-Up System)

Next, details of the wireless connection set-up system 1 according to the present embodiment will be described.

Figure 3:
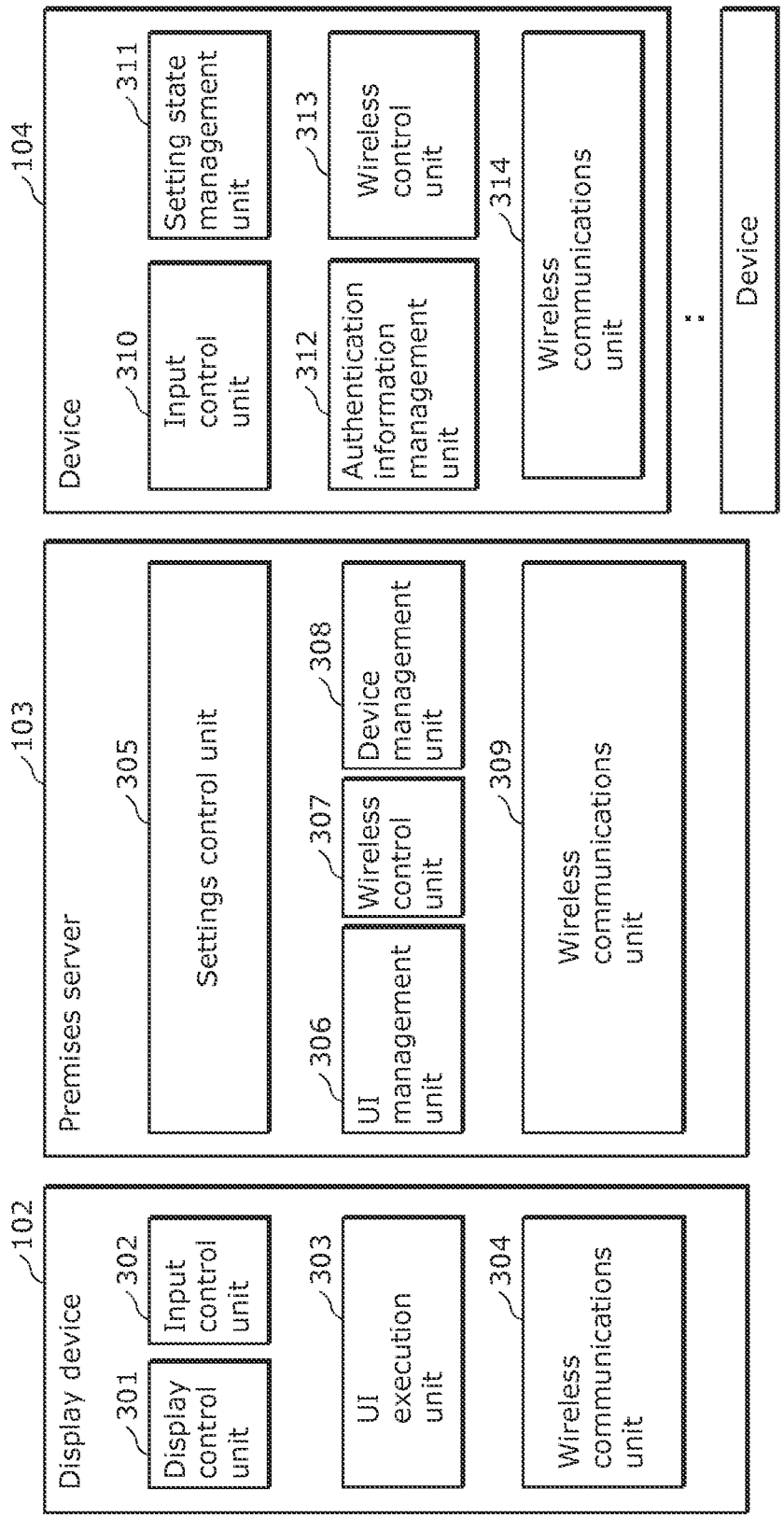
FIG. 3 is a block diagram showing an example of an internal structure of a wireless connection set-up system according to the embodiment 1.

FIG. 3 is a block diagram showing an example of internal structures of the display device 102, the premises server 103, and the device 104 included in the wireless connection set-up system 1.

As shown in FIG. 3, the display device 102 includes, for example, a display control unit 301, an input control unit 302, a UI execution unit 303, and a wireless communications unit 304. Also as shown in FIG. 3, the premises server 103 includes, for example, a settings control unit 305, a UI management unit 306, a wireless control unit 307, a device management unit 308, and a wireless communications unit 309. As shown in FIG. 3, the device 104 includes, for example, an input control unit 310, a setting state management unit 311, an authentication information management unit 312, a wireless control unit 313, and a wireless communications unit 314. While FIG. 3 shows the example of the internal structure of the device 104 in a block diagram, the internal structures of the devices 105 and 106 are the same as that of the device 104 shown in FIG. 3, and thus not shown in the figure.

First, the display device 102 will be described.

The display control unit 301 controls display, on the touch panel 102a of the UI screen 110, corresponding to a result of execution carried out by the UI execution unit 303. The input control unit 302 receives input to the touch panel 102a from the user via the UI screen 110 displayed on the touch panel 102a, and transmits the received input to the UI execution unit 303.

The UI execution unit 303 displays the UI screen 110 on the touch panel 102a, using UI data information which is obtained from the UI management unit 306 of the premises server 103 via the wireless communications unit 304.

The wireless communications unit 304 controls a communication circuit (not shown) to transmit and receive data via the home wireless network. The wireless communications unit 304 transmits and receives data by WPS or AOSS. The wireless communications unit 304, specifically, transmits to the premises server 103 information that is received by the UI execution unit 303 from the input control unit 302, and receives the display information for displaying the UI screen 110 generated by the premises server 103, for example.

The display control unit 301, the input control unit 302, the UI execution unit 303, and the wireless communications unit 304 are, for example, each stored in the form of a program that defines its operation into a memory (not shown), and each function by a CPU (not shown) executing the program.

Next, the premises server 103 will be described.

The UI management unit 306 retains the UI data information for use in generating the UI screen 110 to be executed by the display device 102, in a storage such as a memory or a hard disk. Also, the UI management unit 306 receives information (such as a get device listing request and a PIN code registration request) indicative of instructions from the user, included in the information transmitted from the display device 102, and transmits the instructions from the user to the settings control unit 305.

The settings control unit 305 receives the information indicative of the instructions from the user from the UI management unit 306, and gives the UI management unit 306 instructions for generating the UI data such as a device name or icon data corresponding to the device.

Moreover, the settings control unit 305 gives the wireless control unit 307 instructions regarding an operating mode of the wireless control unit 307. Specifically, the settings control unit 305 instructs the wireless control unit 307 to activate in the normal mode (STA) or to activate in the configuration mode (AP). The settings control unit 305 also instructs the wireless control unit 307 to execute WPS, for example. Moreover, the settings control unit 305 instructs the device management unit 308 to obtain a list of devices, for example.

In response to the instructions from the settings control unit 305, the wireless control unit 307 executes WPS or switches between a communication mode (the configuration mode) in which the wireless control unit 307 communicates as an AP with the wireless communications unit 309 and a communication mode (the normal mode) in which the wireless control unit 307 communicates as an STA with the wireless communications unit 309, for example.

In response to the instructions from the settings control unit 305, the device management unit 308 retains and manages information on the devices 104, 105, and 106 in the device management information.

The wireless communications unit 309 controls a communication circuit (not shown) to transmit and receive data via the home wireless network. The wireless communications unit 309 transmits and receives data by WPS or AOSS.

The settings control unit 305, the UI management unit 306, the wireless control unit 307, the device management unit 308, and the wireless communications unit 309 are, for example, each stored in the form of a program that defines the above-mentioned operation into a memory (not shown), and each function by a CPU (not shown) executing the program.

Next, the device 104 will be described.

The input control unit 310 receives input from the user and transmits information indicative of the received input to the setting state management unit 311. If the setting state management unit 311 receives instructions to power ON the device 104 or the like, as information indicative of the input from the input control unit 310, and if the device 104 is unconfigured, the setting state management unit 311 instructs the wireless control unit 313 to activate as an AP, or receives instructions for execution of WPS from the premises server 103 and obtains the authentication information from the authentication information management unit 312 to instruct the wireless control unit 313 to execute WPS, for example.

The authentication information management unit 312 manages the authentication information such as a PIN code for authenticating the device 104. In response to the instructions from the setting state management unit 311, the wireless control unit 313 instructs the wireless communications unit 314 to switch between the AP mode and the STA mode or executes WPS, for example. The wireless communications unit 314 controls a communication circuit (not shown) to transmit and receive data via the home wireless network. The wireless communications unit 314 transmits and receives data by WPS or AOSS.

The input control unit 310, the setting state management unit 311, the authentication information management unit 312, the wireless control unit 313, and the wireless communications unit 314 are, for example, each stored in the form of a program that defines its operation into a memory (not shown), and each function by a CPU (not shown) executing the program.

It should be noted that the functionality of the display device 102 may be incorporated into the premises server 103 included in the wireless connection set-up system according to the embodiment 1 if the premises server 103 possesses display capabilities. In this case, the display device 102 is not necessarily required.

Moreover, the display device 102 may hold the UI data information and transmit instructions to the UI management unit 306 of the premises server 103.

Figure 4:
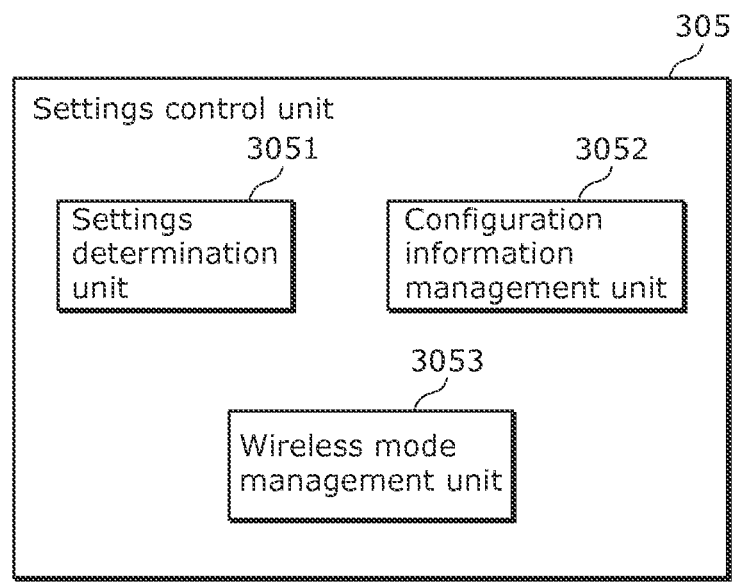
FIG. 4 is a block diagram showing an example of an internal structure of a settings control unit according to the embodiment 1.

FIG. 4 is a block diagram showing an internal structure of the settings control unit 305 included in the premises server 103. As shown in FIG. 4, the settings control unit 305 includes a settings determination unit 3051, a configuration information management unit 3052, and a wireless mode management unit 3053.

The settings determination unit 3051 determines whether the connection settings of the premises server 103 to a device can be configured using the configuration information being held by the configuration information management unit 3052.

The settings determination unit 3051 also determines whether the operating mode of the premises server 103 may be switched to the configuration mode based on, for example, the wireless mode management information 701 (see FIG. 7) retained by the wireless mode management unit 3053. For doing this, the settings determination unit 3051 determines that wireless capabilities in the configuration mode are available if, for example, there is no device being wirelessly connected to the home network provided by the premises server 103 in the normal mode.

Moreover, based on information on the unconfigured device obtained from device management information 901 (see FIG. 9) retained by the device management unit 308, the settings determination unit 3051 specifies, from the wireless mode management information 701, a network ID provided by the unconfigured device, and activates the wireless control unit 307 as an AP (i.e, activates it in the configuration mode) using the specified network ID, and determines whether to instruct the wireless control unit 307 to execute WPS, etc., based on the configuration information managed by the configuration information management unit 3052.

Also, the settings determination unit 3051 determines whether to activate the wireless mode management unit 3053 as an STA in order to communicate with a configured device obtained from the device management information 901 retained by the device management unit 308.

The configuration information management unit 3052 manages the configuration information for wirelessly connecting to the home wireless network.

The wireless mode management unit 3053 uses wireless mode management information described below to manage a mode that is currently operating (the normal (STA) mode or the configuration (AP) mode).

Figure 5:
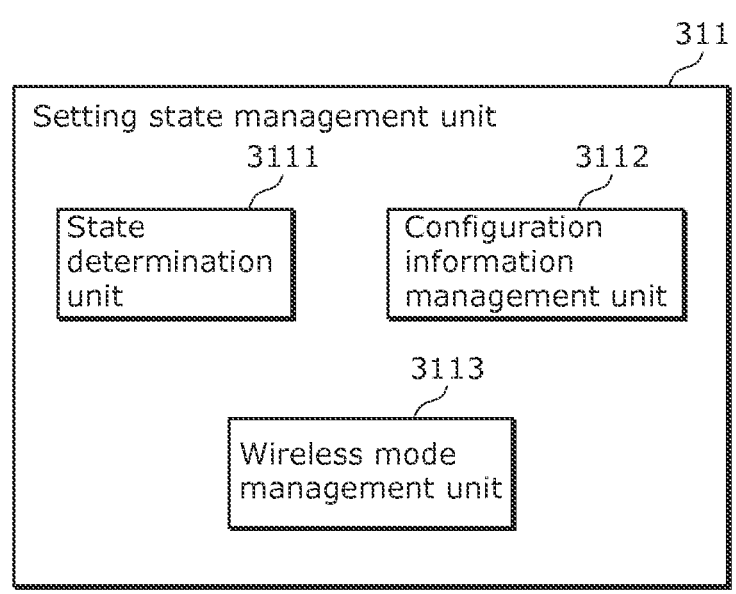
FIG. 5 is a block diagram showing an example of an internal structure of a setting state management unit according to the embodiment 1.

FIG. 5 is a block diagram of an internal structure of the setting state management unit 311 of the device 104. As shown in FIG. 5, the setting state management unit 311 includes a state determination unit 3111, a configuration information management unit 3112, and a wireless mode management unit 3113.

The state determination unit 3111 determines whether the configuration information management unit 3112 is holding the configuration information transmitted from the premises server 103. If the configuration information management unit 3112 is holding the configuration information, the state determination unit 3111 determines whether the connection settings of the device 104 to the premises server 103 can be configured using the configuration information.

If the configuration information management unit 3112 is not holding the configuration information transmitted from the premises server 103 and unconfigured, the state determination unit 3111 instructs the wireless mode management unit 3113 to activate in the configuration mode (as an AP). At this time, the state determination unit 3111 specifies configuration information (a network ID) to be used in the configuration mode, based on the wireless mode management information managed by the wireless mode management unit 3113. Moreover, if the wireless mode management unit 3113 receives the configuration information from the premises server 103, the state determination unit 3111 instructs the wireless control unit 313 to execute WPS.

The configuration information management unit 3112 manages the configuration information (i.e., the configuration information transmitted from the premises server 103) for wirelessly connecting to the wireless network provided by the premises server 103.

The wireless mode management unit 3113 manages a mode in which the device 104 is currently operating (the normal (STA) mode or the configuration (AP) mode).

Figure 6:
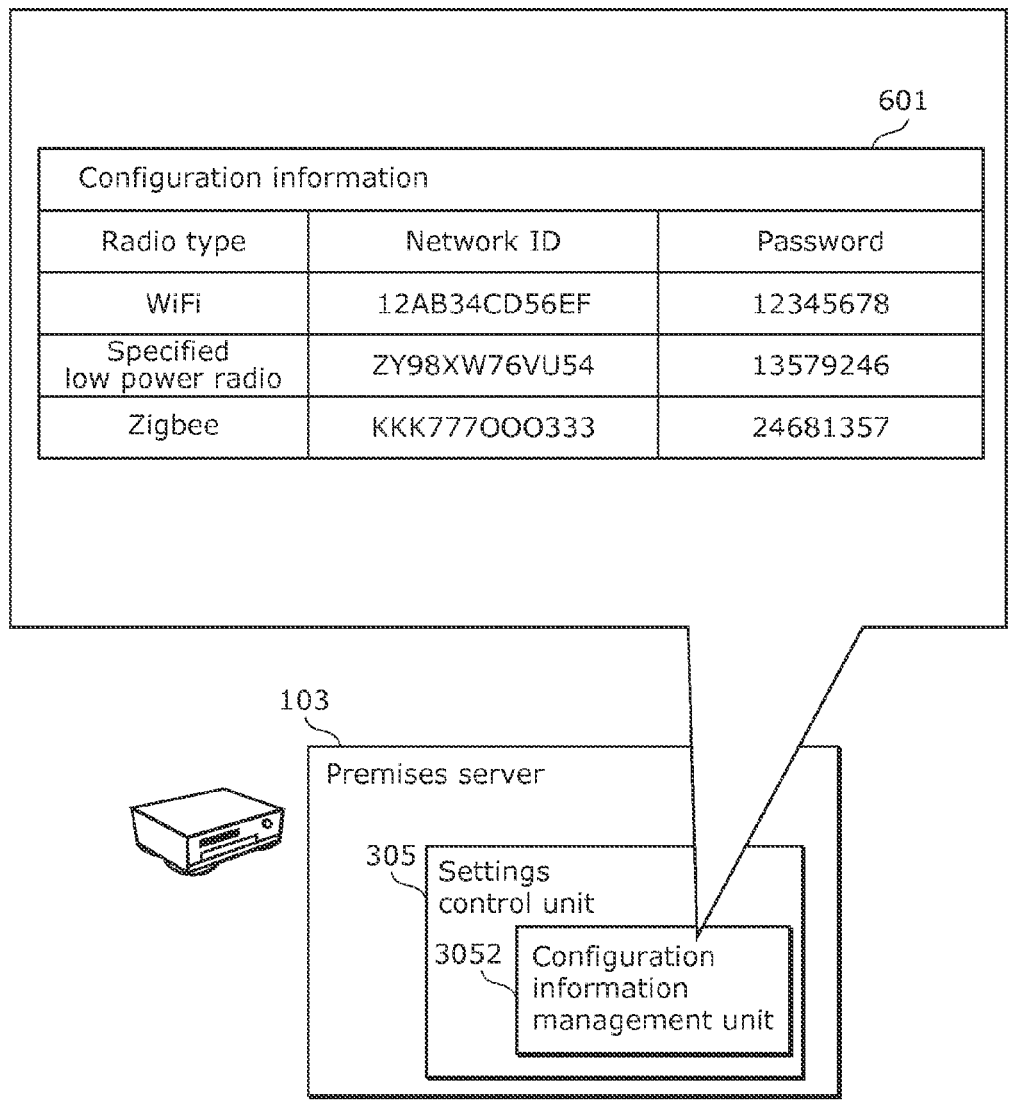
FIG. 6 is a diagram showing an example configuration information in the embodiment 1.

FIG. 6 is a diagram showing an example of the configuration information retained by the premises server 103.

Configuration information 601 is managed by the configuration information management unit 3052 of the premises server 103, and includes wireless communications methods which the premises server 103 can provide, network IDs corresponding to the wireless communications methods, and passwords corresponding to the network IDs. In other words, different network IDs and passwords are associated for different wireless communications methods in the configuration information 601.

Figure 7:
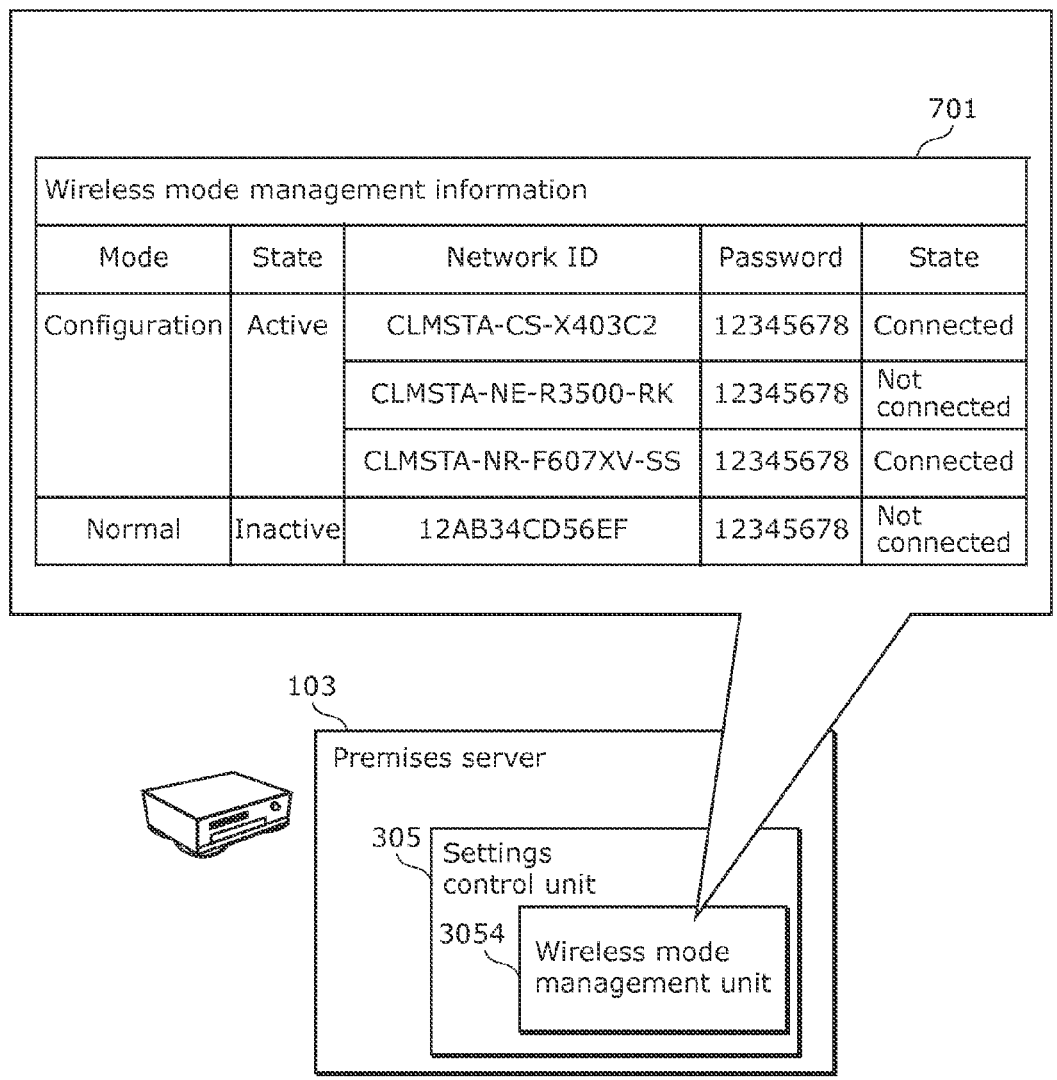
FIG. 7 is a diagram showing an example of wireless mode management information in the embodiment 1.

FIG. 7 is a diagram showing an example of the wireless mode management information retained by the premises server 103.

The wireless mode management information 701 is managed by the wireless mode management unit 3053 of the premises server 103. The wireless mode management information 701 includes, for example, a current operating mode (configuration mode/normal mode) of the premises server 103, a state of the operating mode (active/inactive), a network ID, a password, and a setting state (connected/not connected) to the home network.

Figure 8:
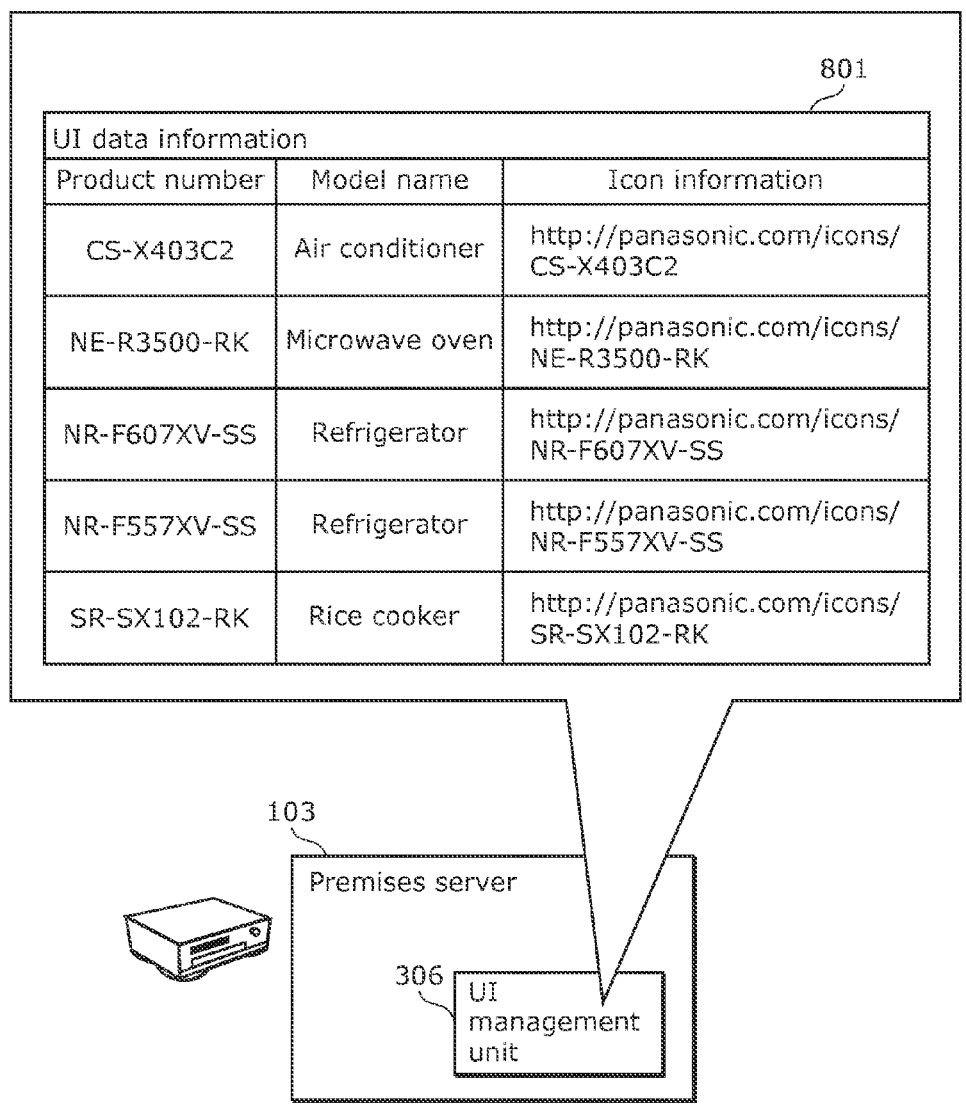
FIG. 8 is a diagram showing an example of a user interface (Hereinafter, referred to as "UI".) data information in the embodiment 1.

FIG. 8 is a diagram showing an example of the UI data information retained by the premises server 103.

UI data information 801 is managed by the UI management unit 306 of the premises server 103, and includes product numbers, model names, and icon information of devices. In this example, the icon information includes information on URL where the icon information is stored. The premises server 103 accesses the URL to obtain latest icon information.

Figure 9:
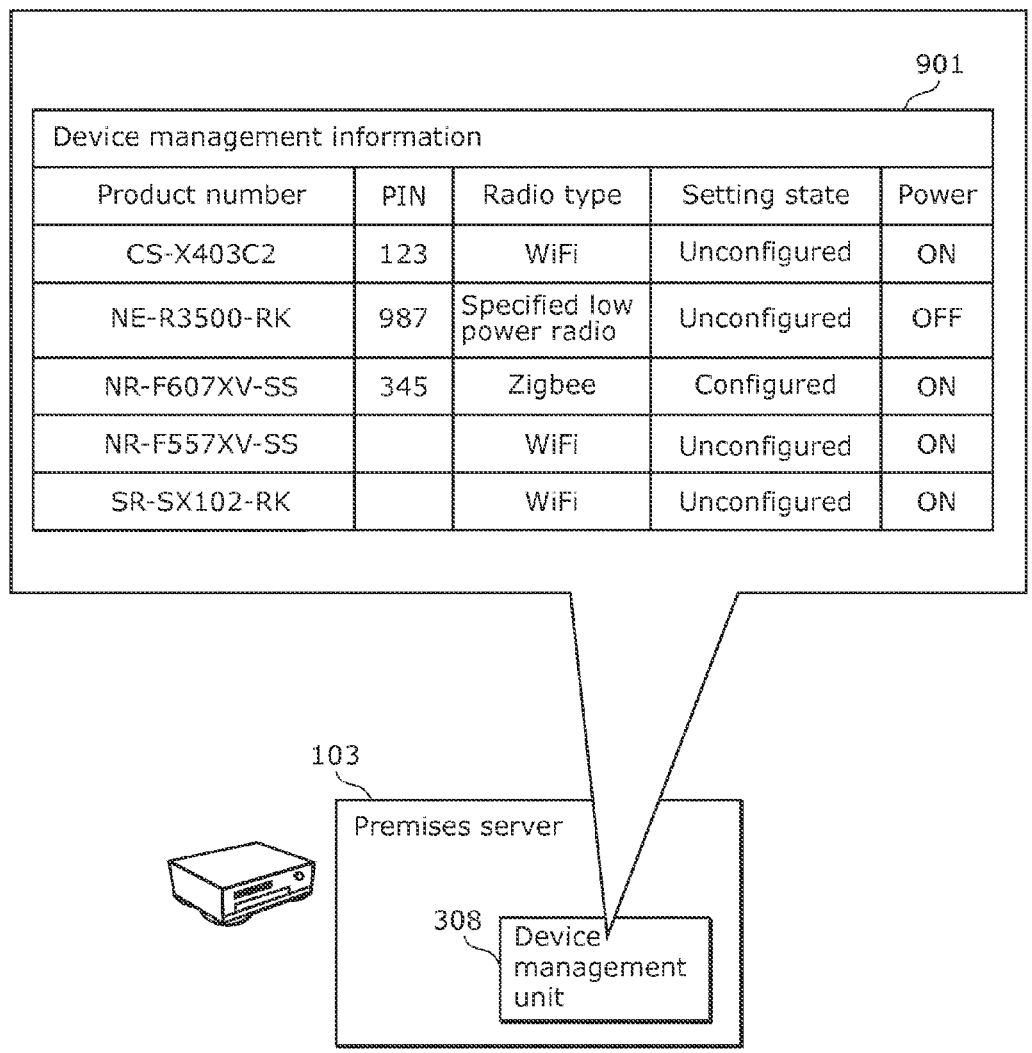
FIG. 9 is a diagram showing an example of device management information in the embodiment 1.

FIG. 9 is a diagram showing an example of device management information retained by the premises server 103.

The device management information 901 is managed by the device management unit 308 of the premises server 103, and includes product numbers, PIN codes, radio types, setting states, and power states of the devices. A radio type indicates a type (i.e., wireless communications method) of a wireless network, such as WiFi, specified low power radio, and Zigbee (registered trademark).

Figure 10:
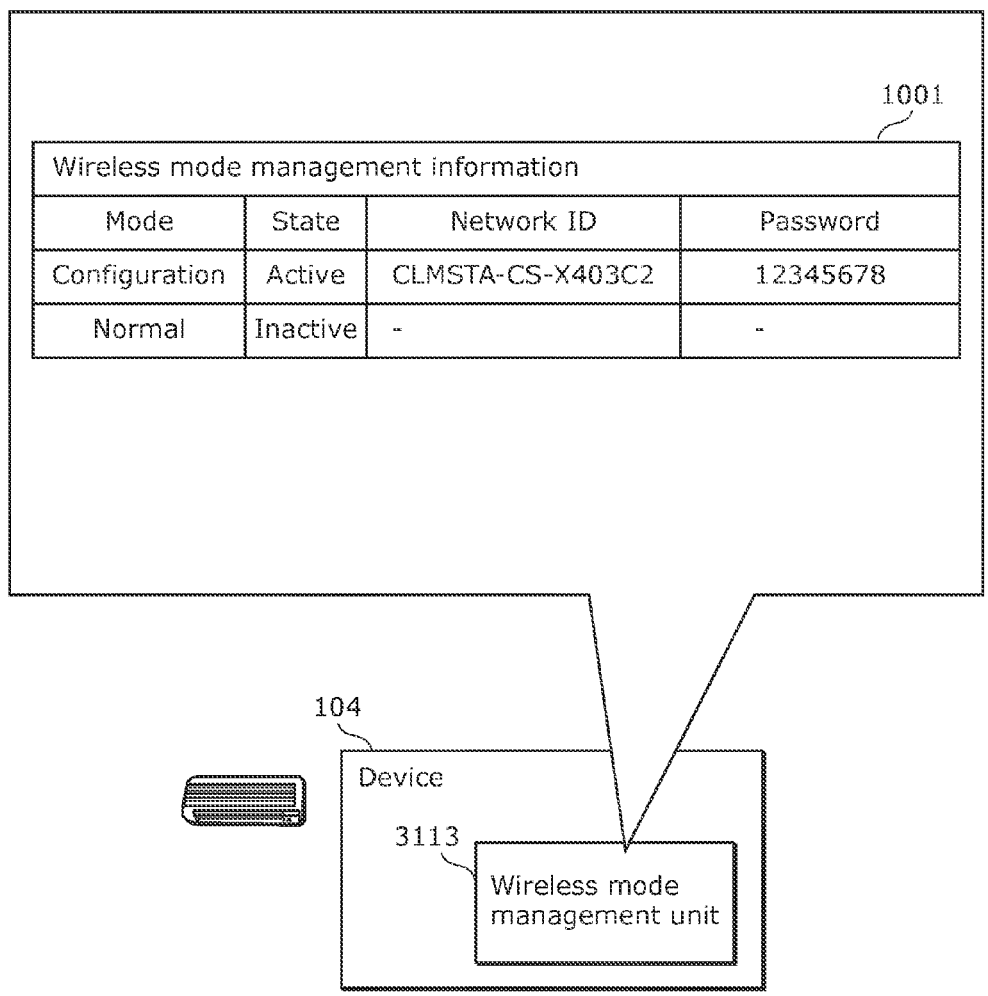
FIG. 10 is a diagram showing an example of wireless mode management information in the embodiment 1.

FIG. 10 is a diagram showing an example of the wireless mode management information retained by the device 104.

Wireless mode management information 1001 is managed by the wireless mode management unit 3113 of the device 104, and includes operating modes (configuration mode/ normal mode), states (active/inactive) of the operating modes, and the configuration information (a network ID and a password). The configuration information is used while the device 104 is being unable to wirelessly connect to the home wireless network provided by the premises server 103.

While in FIGS. 7 and 10, a character string starting with "CLMSTA-" followed by a product number of a corresponding device is provided as a network ID, the network ID is not limited thereto and may be any string insofar as association of the network ID with the device can be identified therefrom.

In the following, details of processing of configuring the connection settings of the unconfigured device 104 to the home network provided by the premises server 103 in the wireless connection set-up system 1 will be described, with reference to flowcharts illustrated in FIGS. 11, 12, and 13. Specifically, the connection settings are configured by copying, under instructions from the display device 102, the configuration information held by the premises server 103 to the unconfigured device 104 or 105, etc.

Figure 11:
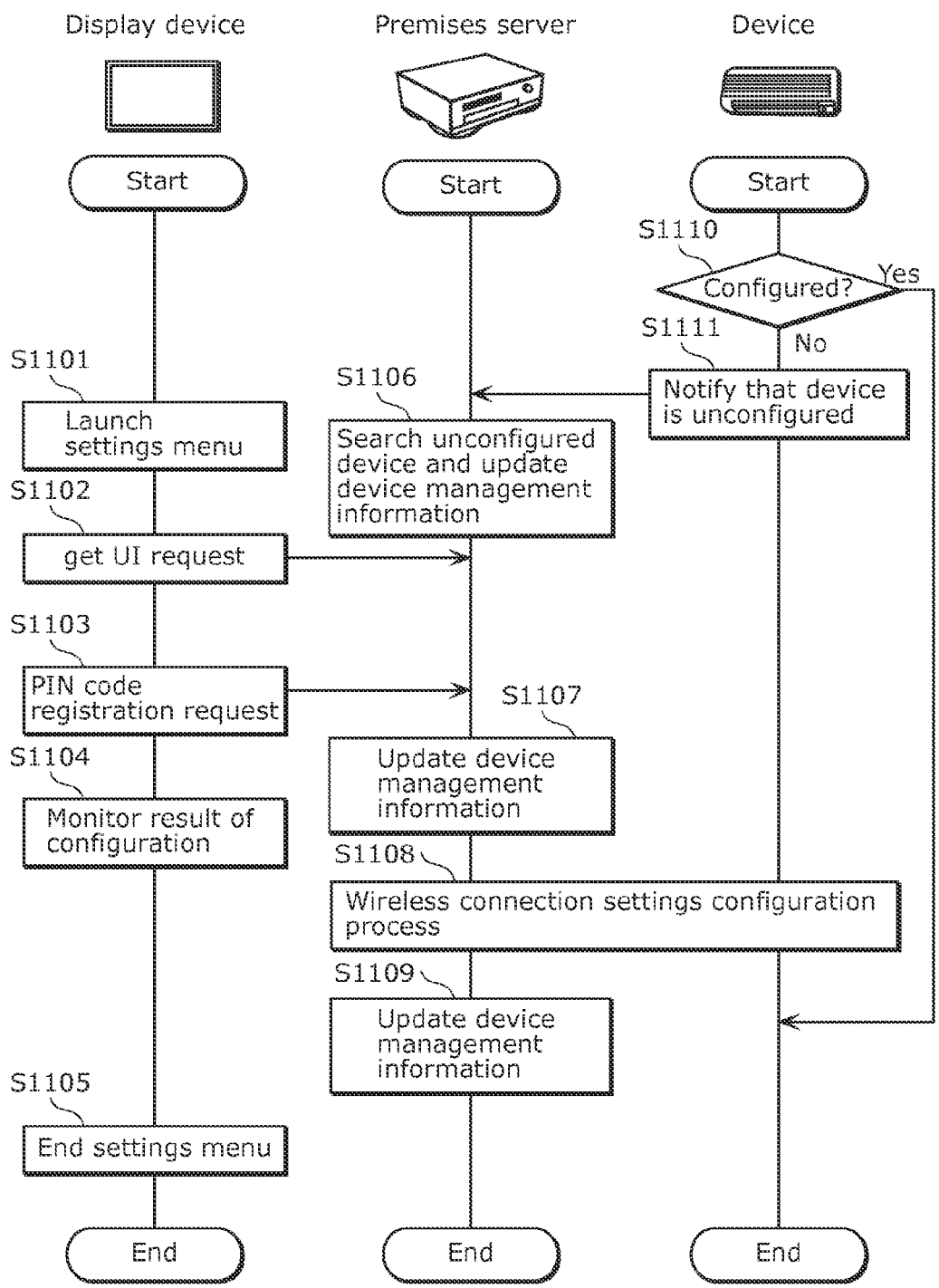
FIG. 11 is a flowchart illustrating an example of specific operation of a display device, a premises server, and a device included in the wireless connection set-up system according to the embodiment 1.

FIG. 11 is a flowchart illustrating an example of specific operation of the display device 102, the premises server 103, and the device 104 included in the wireless connection set-up system 1. In FIG. 11, suppose that the connection settings of the display device 102 and the premises server 103 to the home network are already configured. The display device 102 and the premises server 103 are given IP addresses which are used over the home network, and communicate with each other using the IP addresses.

The device 104 is an unconfigured device the connection settings configuration process on which to connect to the home network has not been completed at a time of commencing the processing illustrated in FIG. 11. The premises server 103 and the device 104 are previously assigned unique addresses, such as MAC addresses, and communicate with each other using the MAC addresses until the completion of the connection settings configuration process. The type of radio signal transmitted from the premises server 103 is the same as the type of the radio signal transmitted from the device 104. In other words, the premises server 103 identifies the type of the radio signal transmitted from the device 104, and transmits to the device 104 a radio signal having the same type as the identified type.

When communicating with each other using the MAC addresses, the premises server 103 and the device 104 transmit necessary information in beacon signals.

In response to the completion of the connection settings configuration process, the device 104 is given an IP address to be used to connect to the home network provided by the premises server 103. Thus, the device 104 and the premises server 103 communicate with each other using IP addresses after the completion of the connection settings configuration process.

First, the flow of processing performed by the display device 102 will be described.

When the user operates the touch panel 102a of the display device 102 to give instructions to launch a settings menu (S1101), the input control unit 302 sends the UI execution unit 303 instructions to launch the settings menu.

The UI execution unit 303 under the instructions to launch settings menu sends a request to obtain the icon information from the UI data information 801 in the premises server 103 via the wireless communications unit 304 and obtain information on the setting states of devices from the device management information 901 (S1102). This allows the UI execution unit 303 to obtain the icon information and the information on the setting states of the devices, generates the UI screen 110 based on the obtained icon information and information on the setting states, and sends the display control unit 301 the UI screen 110 as the display information. In other words, the UI execution unit 303 of the display device 102 transmits to the premises server 103 a get UI request for obtaining the information (the icon information and the information on the setting states of the devices) necessary for generating the UI screen 110. At this time, based on the information on the setting states of the devices, information for allowing the user to enter a PIN is displayed for an unconfigured device in association with the icon information of the unconfigured device, and information indicating that a device has been configured is displayed for a configured device in association with the icon information of the configured device.

If the user enters a PIN code into the entry field 113 for entering a PIN code of the unconfigured device 104, the input control unit 302 sends the UI execution unit 303 information indicative of the entered PIN code. When received the information indicative of the PIN code, the UI execution unit 303 uses the wireless communications unit 304 to transmit the information indicative of the PIN code to the premises server 103 and instructs (requests) the premises server 103 to make PIN registration of the device 104 using the PIN code. Then, the premises server 103 registers the PIN code indicated by the received information with the device management information 901 (S1103).

After the PIN registration, the premises server 103 notifies the user of the completion of the PIN registration. The display device 102 thereafter monitors presence or absence of receipt of a result of configuration of the connection settings transmitted from the premises server 103 (S1104). If the display device 102 receives the result from the premises server 103 the display device 102 notifies the user of the result. Then, the display device 102 ends the settings menu if the display device 102 receives instructions to do so from the user (S1105). It should be noted that the display device 102 may end the settings menu after a predetermined time periods has elapsed.

Next, the flow of processing performed by the premises server 103 will be described.

The premises server 103 causes the device management unit 308 to search an unconfigured device and a configured device at predetermined timing (e.g., periodically) and update the wireless mode management information 701 and the device management information 901 (S1106). If received the get UI request from the display device 102 (S1102), the UI management unit 306 transmits, to the display device 102 via the wireless communications unit 309, latest UI data information, and the information indicative of the setting states of corresponding devices included in the device management information 901.

Thereafter, if the UI management unit 306 is given instructions to make the PIN registration from the display device 102 (S1103), the UI management unit 306 passes the instructions to the settings determination unit 3051 of the settings control unit 305 and the device management unit 308.

The device management unit 308 registers the PIN code thereby updating the device management information 901 (S1107), and the settings determination unit 3051 of the settings control unit 305 uses the registered PIN code to perform processing of configuring the connection settings to the device 104 (S1108). Details of the wireless connection settings configuration process (S1108) will be described in FIG. 12. After completion of the wireless connection settings configuration process, the device management unit 308 updates the device management information 901 (S1109) again.

Last, the flow of processing performed by the device 104 will be described.

Upon power-ON of the device 104, the state determination unit 3111 of the setting state management unit 311 checks if the configuration information management unit 3112 retains the configuration information transmitted from the premises server 103 (i.e., if the device 104 has been configured) (S1110). If the device 104 is determined to be configured (Yes in S1110), the device 104 ends the processing with no further operation. If the device 104 is determined to be unconfigured (No in S1110), the state determination unit 3111 instructs the wireless mode management unit 3113 to operate in the configuration mode. In doing so, the wireless mode management unit 3113 specifies the network ID of the wireless mode management information 1001 held by the wireless mode management unit 3113, thereby instructing the wireless control unit 313 to operate as an AP. Then, the wireless communications unit 314 of the device 104 transmits, to the premises server 103, the configuration information including the network ID and the password retained in the wireless mode management information 1001 in a beacon signal (S1111). The wireless control unit 313 of the device 104 performs the wireless connection settings configuration process in response to instructions from the premises server 103 (S1108).

Figure 12:
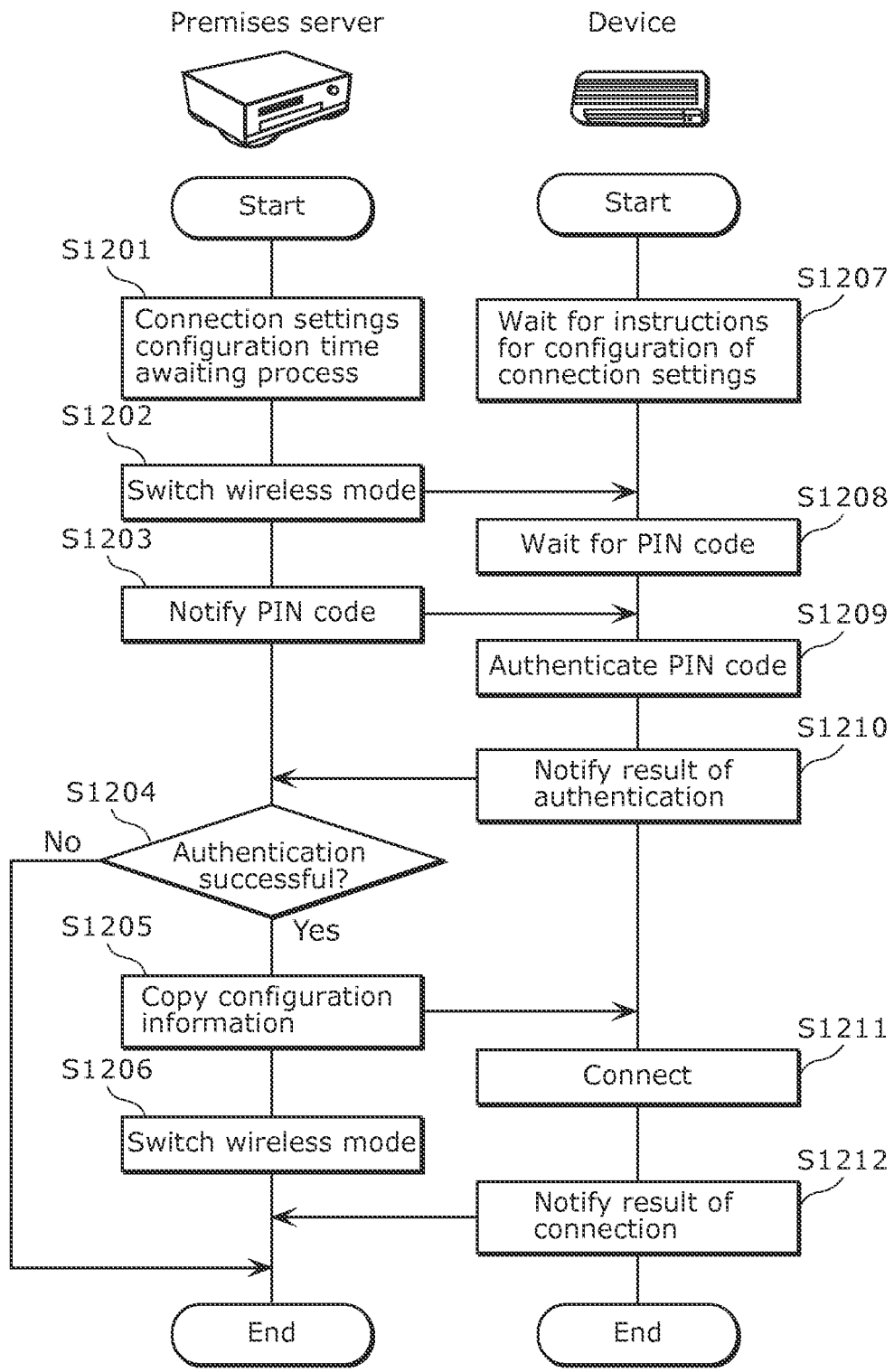
FIG. 12 is a flowchart illustrating a specific example of a wireless connection settings configuration process in FIG. 11.

FIG. 12 is a flowchart illustrating details of the wireless connection settings configuration process (S1108) in FIG. 11.

First, the flow of processing performed by the premises server 103 will be described.

The settings determination unit 3051 of the premises server 103 waits until a device is ready for connection settings configuration thereof (S1201). Details of the connection settings configuration time awaiting process of step S1201 will be described, with reference to FIG. 13. If the device is ready for the connection settings configuration in step S1201, the settings determination unit 3051 instructs the wireless mode management unit 3053 to switch the device (Hereinafter, referred to as a "target device.") that is powered ON and whose setting state in the device management information 901 obtained from the device management unit 308 indicates "Unconfigured," to the configuration mode.

The wireless mode management unit 3053 instructs the wireless control unit 307 to obtain a network ID and a password of the target device from the wireless mode management information 701 to wirelessly connect to the target device (S1202). After the wireless connection is completed, the wireless mode management unit 3053 instructs the wireless control unit 307 to initiate the PIN code authentication (S1203). At this time, the PIN code of the target device has been reflected to the device management information 901 since the PIN code is already input in S1103 of FIG. 11. Thus, the wireless control unit 307 uses the device management information 901 to transmit to the target device the PIN code corresponding to the target device.

When the wireless mode management unit 3053 of the premises server 103 receives a result (response information) of the PIN code authentication from the device 104, the wireless mode management unit 3053 determines whether the result indicates successful authentication (S1204). If the result indicates successful authentication (Yes in S1204), the wireless mode management unit 3053 instructs the wireless control unit 307 to copy, among the pieces of the configuration information 601 managed by the configuration information management unit 3052, configuration information that corresponds to a wireless communications method of the beacon signal received from the target device and transmit the copied configuration information. The wireless control unit 307 under the instructions causes the wireless communications unit 309 to transmit the configuration information to the device 104 (S1205).

After the transmission of the configuration information, the settings determination unit 3051 repeats steps S1202 through S1205 for the number of the other target devices, if any, that are unconfigured and powered ON. In other words, the processes of steps S1202 through S1205 are performed for each target device. After completion of the processing, the settings determination unit 3051 instructs the wireless mode management unit 3053 to switch the operating mode from the configuration mode (AP) to the normal mode (STA) and activate in the normal mode (S1206).

Next, the flow of processing performed by the device 104 will be described.

The state determination unit 3111 waits until the wireless mode management unit 3113 receives, from the premises server 103, the network ID in the wireless mode management information 1001 to be used in the configuration mode (S1207). If the wireless mode management unit 3113 receives the network ID in the wireless mode management information 1001 to be used in the configuration mode from the premises server 103, the state determination unit 3111 instructs the wireless control unit 313 to initiate PIN authentication and waits until a PIN code arrives from the premises server 103 (S1208). When received the PIN code from the premises server 103, the state determination unit 3111 conducts authentication of determining whether the received PIN code and the authentication information (the PIN code) managed by the authentication information management unit 312 match (S1209). Then, the state determination unit 3111 causes the wireless communications unit 314 to transmit a result of the authentication to the premises server 103 (S1210). If the receive PIN code and the managed PIN code match the authentication is successful), the state determination unit 3111 waits to receive configuration information that corresponds to the wireless communications method of the device 104 from the premises server 103, and performs the connection settings configuration process (S1211) after the configuration information arrives. After the end of the connection settings configuration process, the state determination unit 3111 transmits a result of the connection settings configuration process to the premises server 103 (S1212).

Figure 13:
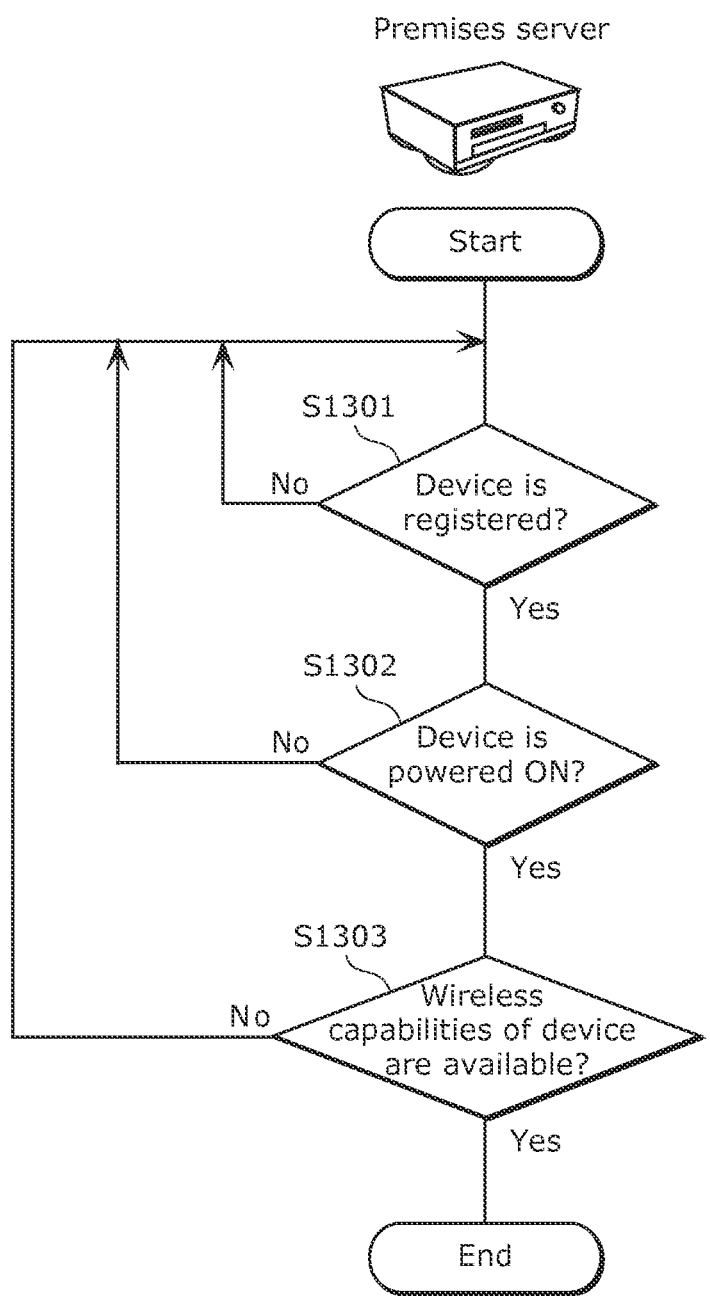
FIG. 13 is a flowchart illustrating a specific example of a connection settings configuration time awaiting process in FIG. 12.

FIG. 13 is a flowchart illustrating details of the connection settings configuration time awaiting process (S1201) in FIG. 12.

The settings determination unit 3051 obtains the device management information 901 from the device management unit 308 to determine whether there is an unconfigured device whose PIN code is registered with the obtained device management information 901 (S1301). If there is an unconfigured device whose PIN code is registered with the device management information 901 (Yes in S1301), the settings determination unit 3051 determines whether the unconfigured device is powered ON (S1302). If the unconfigured device is powered ON (Yes in S1302), the settings determination unit 3051 determines whether wireless capabilities of the unconfigured device are available for application of configuration of the connection settings (S1303). If the wireless capabilities are available for application of the configuration of the connection settings (Yes in S1303), the settings determination unit 3051 undoes the connection settings configuration time awaiting process and the process proceeds to S1202 in FIG. 12. The settings determination unit 3051 returns to step S1301 if a PIN code of the unconfigured device is not registered with the device management information 901 (No in S1301 if the configuration device is not powered ON (No in S1302), or if the wireless capabilities are unavailable for application of the configuration of the connection settings configuration (No in S1303). In other words, the settings determination unit 3051 continues to wait for the connection settings configuration time until the determination in all steps S1301 through S1303 results Yes.

In such a manner, the operating mode of the premises server 103 does not switch to the configuration mode if, at the time of registration of the PIN code of the device, the device is not powered on or the user of the device is using a service (e.g., wirelessly viewing recorded content in a room a different from one where the content was recorded) making use of wireless capabilities. Even in such a case, the settings determination unit 3051 of the premises server 103 performs the connection settings configuration time awaiting process in FIG. 13, thereby allowing not only the connection settings to be configured in a staggered fashion but also the configuration of the connection settings to be initiated after the unconfigured device is powered on or when the user no longer uses the service making use of the wireless capabilities.

Moreover, even if the premises server 103 does not have the display capabilities, the device information can be entered through the display device 102. This can alleviate the burden to the user of providing input for the configuration of the connection settings.

Figure 14:
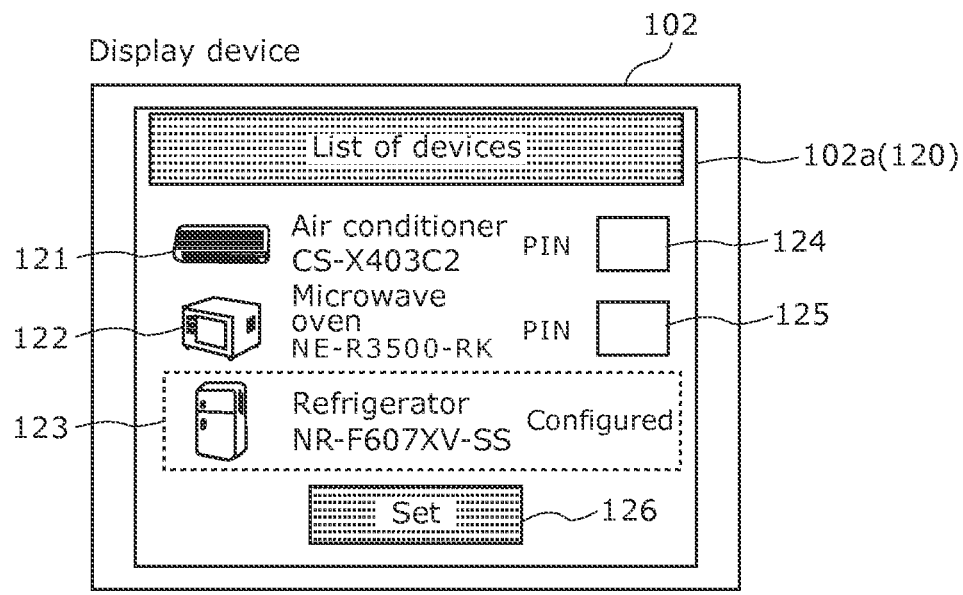
FIG. 14 is a diagram showing an example of the UI at a time of PIN registration in the embodiment.

FIG. 14 is a diagram showing an example (i.e., an example of a UI screen different from the UI screen 110 FIG. 2) of a UI screen 120 displayed on the touch panel 102*a* of the display device 102 when a PIN code entered through a UI screen of the display device 102 is to be registered in step S1103 in FIG. 11.

The user enters the PIN code on the UI screen 120 of FIG. 14, using a software keyboard (not shown) or the like displayed on the UI screen 120 of the display device 102. At this time, an entry field (not shown) for entering information on the device, such as date and time of purchase, may be displayed according to need, and the information entered in the entry field may be added to the device management information 901 in the premises server 103 and managed.

The UI screen 120 is displayed on the touch panel 102*a* of the display device 102 by the UI execution unit 303 of the display device 102 executing the display information generated by the UI management unit 306 of the premises server 103. The display information is generated by the premises server 103 based on the UI data information. The UI data information is, for example, generated by the premises server 103 sending a query to the cloud 101 based on a product number included in a beacon signal transmitted from the unconfigured device, to obtain the information on a type of the device, such as an air conditioner, a microwave oven, and a refrigerator, and icon information corresponding to the device.

The UI screen 120 displays, as shown in FIG. 14, icons 121 and 122 respectively indicating the unconfigured devices 104 and 105, and entry fields 124 and 125 for entering PIN codes on the sides of the icons 121 and 122. Additionally, information 123 on the configured device 106 is displayed on the UI screen 120. In other words, the information 123 on the configured device 106 is, specifically, includes information on an icon and a type of the configured device 106, and information indicating that the device 106 has been configured. Furthermore, an input button 126, "Set," for accepting entries to the entry fields 124 and 125 is displayed on the UI screen 120.

Figure 15:
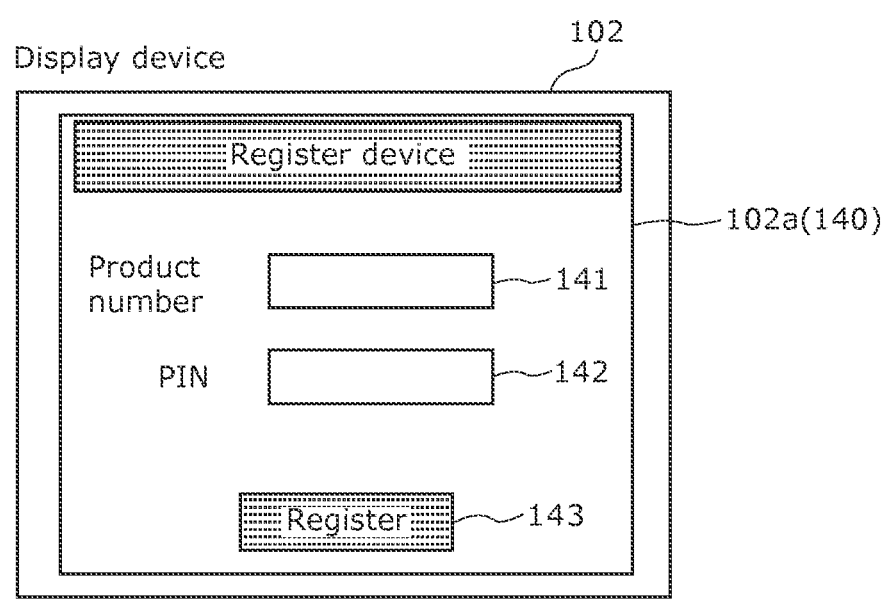
FIG. 15 is a diagram showing an example of the UI at a time of product number/PIN registration in the embodiment.

FIG. 15 is a diagram showing an example of a UI screen 140 which is displayed on a display screen of the display device 102 at the time of product number and PIN registration in step S1103 of FIG. 11. In other words, FIG. 15 shows the UI screen 140 where the user specifies a product number of an unconfigured device and enters a PIN code corresponding to the device.

On the UI screen 140 of FIG. 15, an entry field 141 for entering a product number, an entry field 142 for entering a PIN code, and an input button 143, "Set," for accepting the entries to the entry fields 141 and 142 are displayed. The user is allowed to enter the product number and the PIN code, using a soft keyboard (not shown) or the like separately displayed on the UI screen 140 of the display device 102.

In this example, the product number is registered in step S1103, together with PIN registration.

When using the UI screen 140 the UI management unit 306 receives a request for the product number/PIN registration from the display device 102 (S1103), the UI management unit 306 stores the product number into the UI data information 801 and obtains from the cloud 101 and stores a type of a device corresponding to the product number and the information on the device into the UI data information 801. Thereafter, the UI management unit 306 notifies the obtained type of the device and the information on the device to the device management unit 308 and the settings determination unit 3051 of the settings control unit 305. This obviates the need for including the product number in the beacon signal transmitted from the unconfigured device.

Figure 16:
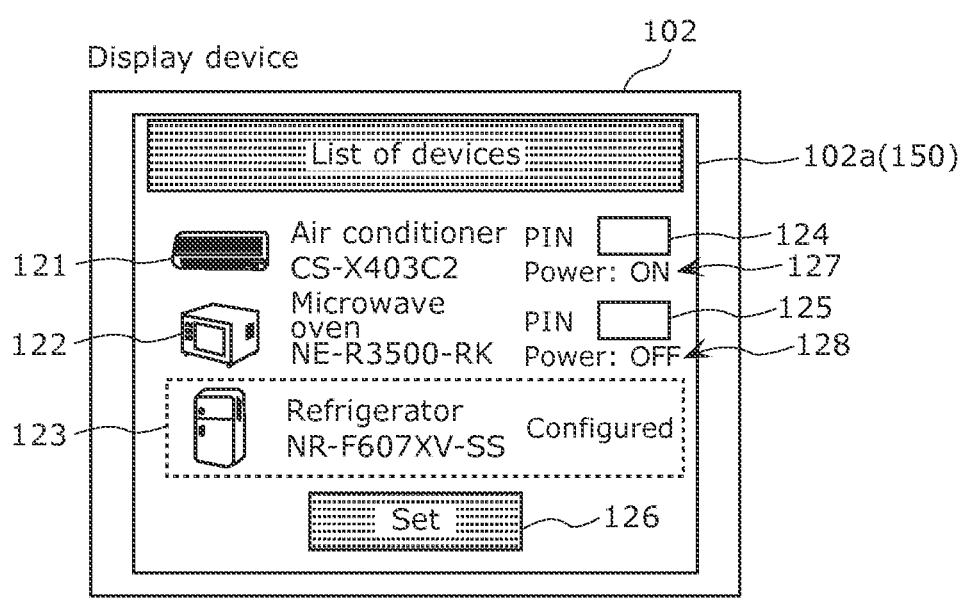
FIG. 16 is a diagram showing an example of the UI at a time of PIN registration in the embodiment.

FIG. 16 is a diagram showing another example of the UI screen of the display device 102 which is shown in step S1103 of FIG. 11 when the user enters a PIN code through a UI screen 150 displayed on the touch panel 102*a* of the display device 102. In the example shown in FIG. 16, the display device 102 further receives corresponding information on power states of devices included in the device management information 901, in addition to corresponding latest UI data information and information on the setting states of the devices included in the device management information 901. In other words, information 127 and 128 indicative of the power states of the devices are displayed on the UI screen 150 shown in FIG. 16, in addition to the information displayed on the UI screen 120 as shown in FIG. 15. The other information displayed on the UI screen 150 is the same as that displayed on the UI screen 120 and thus the description will be omitted.

For example, even if the unconfigured device is detected in step S1106, the detected device may thereafter be powered off before step S1103 is carried out. In FIG. 16, information as to whether each device is powered ON (i.e., information 127 and 128 on the power states of the device) is displayed so that it can be visually understood by the user. This allows prompting the user to power on an unconfigured device the user wants to configure the connection settings thereof, if the device is powered off.

In the above configuration, in response to the receipt of information indicative of successful authentication from the unconfigured device in configuring the connection settings of the device, the premises server 103 copies and sends, to the unconfigured device, configuration information that corresponds to a type of the radio signal transmitted from the unconfigured device, among pieces of configuration information the premises server 103 provides.

If a wireless communications apparatus (e.g., a relay or a router device, not shown) to host the premises server 103 is disposed inside the user's home as a parent device of the premises server 103, the premises server 103 retains the configuration information (i.e., configuration information for establishing wireless connection with the host wireless communications apparatus) transmitted from the host wireless communications apparatus as the parent device.

Thus, the premises server 103 may not transmit to the unconfigured device the configuration information for establishing the wireless connection with the premises server 103. For example, if the premises server 103 receives the response information indicative of successful authentication from the unconfigured device, the premises server 103 may transmit to the unconfigured device the configuration information received from the parent device of the premises server 103, among the pieces of configuration information the premises server 103 retains. This allows the unconfigured device to establish wireless connection with the host wireless communications apparatus (such as a relay and a router device) using the configuration information for doing so.

(Embodiment 2)

An embodiment 2 according to the present invention will be described. In contrast to the embodiment 1 where the premises server 103 is aware of its ambient conditions and determines the initiation of configuration of connection settings, the user actively specifies a start time of configuration of connection settings of a device in the embodiment 2.

Figure 17:
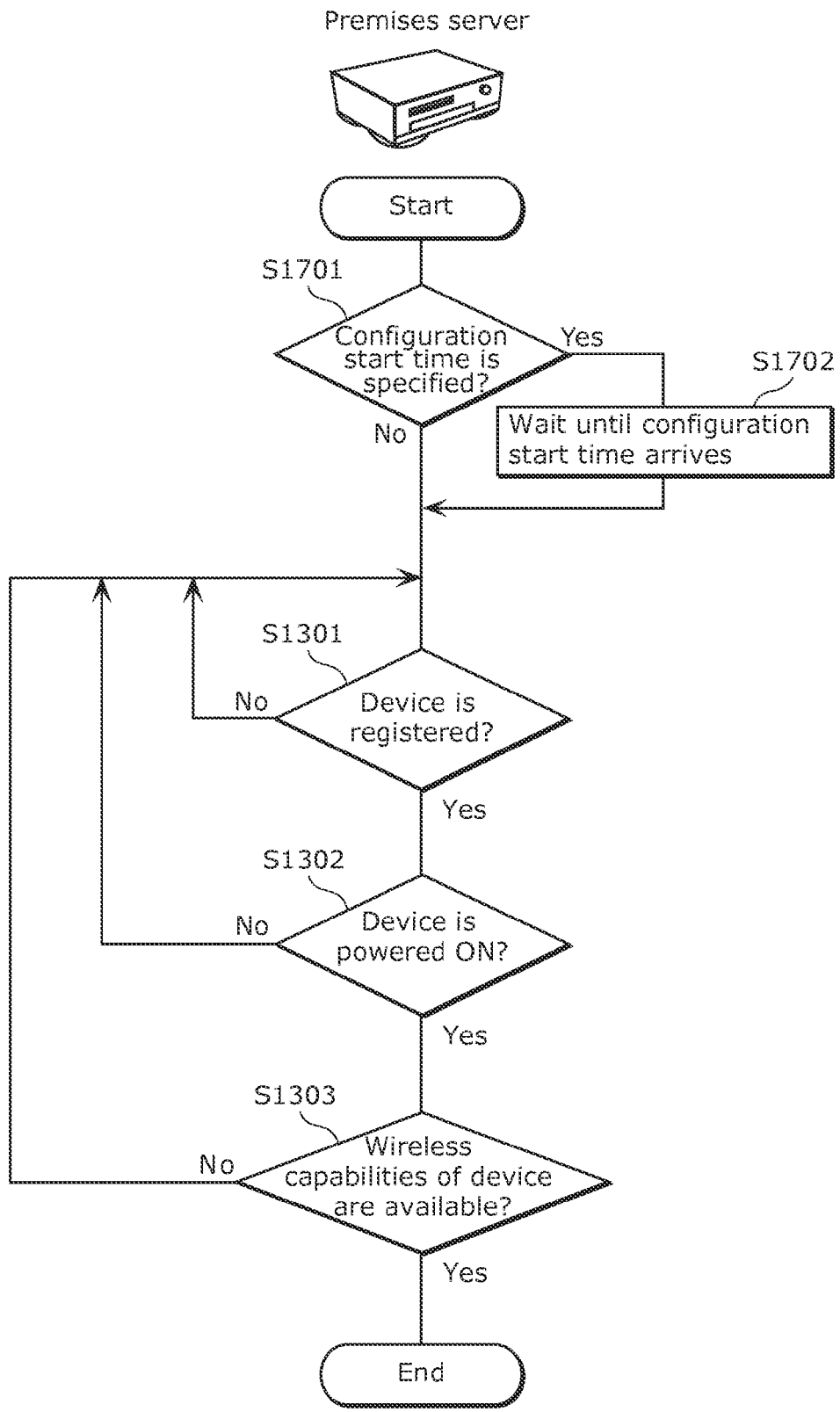
FIG. 17 is a flowchart illustrating extended details of a connection settings configuration time awaiting process in FIG. 13 according to an embodiment 2.

FIG. 17 is a flowchart illustrating extended details of the connection settings configuration time awaiting process (S1301) in FIG. 13.

A settings determination unit 3051 obtains device management information 901 from a device management unit 308 to determine whether a configuration start time is specified in the obtained device management information 901 (S1701). If the configuration start time is specified (Yes in S1701), the settings determination unit 3051 waits until the specified configuration start time arrives (S1702). If a configuration start time is not specified (No in S1701) or if the specified configuration start time has passed (after S1702), the settings determination unit 3051 executes steps S1301 through S1303 described in FIG. 13. It should be noted that the processes of steps S1301 through S1303 are the same as those described with reference to FIG. 13 and thus the description will be omitted.

Allowing the user to specify a time to initiate the configuration of the connection settings of a device in such a manner enables the connection settings to be configured in a time slot where the user of the device is not using a service making use of wireless capabilities (e.g., wirelessly viewing recorded content in a room a different from one where the content was recorded).

Figure 18:
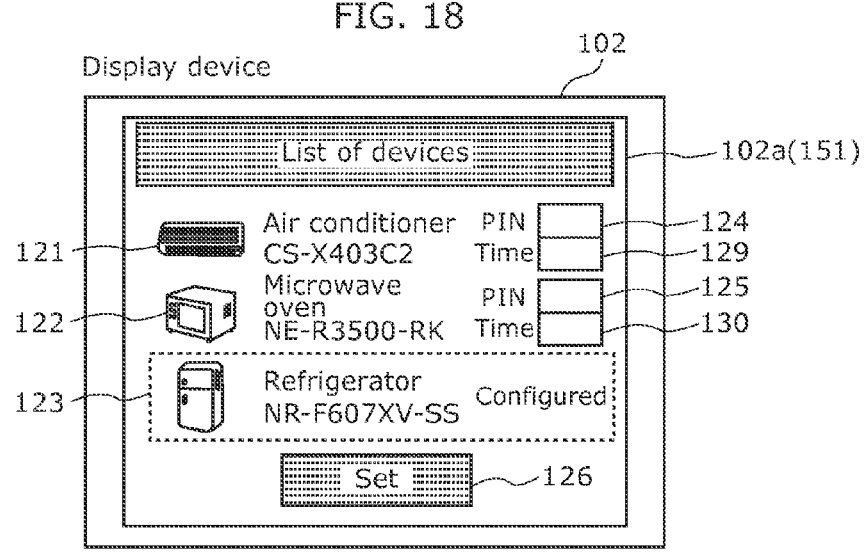
FIG. 18 is a diagram showing an example of a UI at a time of PIN registration in the embodiment 2.

FIG. 18 is a diagram showing an example of a UI screen 151 displayed on a touch panel 102*a* of a display device 102 to transmit the information indicative of the PIN code entered through the UI screen of the display device 102 in step S1203 in FIG. 12 to the device. In the example shown in FIG. 18, the display device 102 displays the UI screen 151 on which the user is allowed to specify a configuration start time which is a start time of configuring connection settings of a device, showing entry fields 129 and 130 for entering configuration start time of corresponding devices, in addition to the information displayed on the UI screen 120 shown in FIG. 14.

Figure 19:
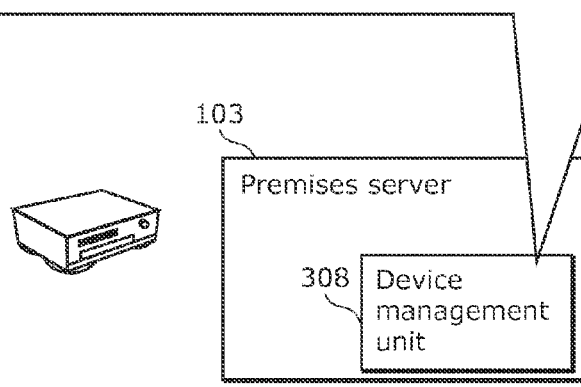
FIG. 19 is a diagram showing an example of device management information in the embodiment 2.

FIG. 19 is a diagram showing another example of the device management information.

Comparing device management information 901*a* shown in FIG. 19 with the device management information 901 shown in FIG. 9, the device management information 901*a* shown in FIG. 19 is different in that the device management information 901 further includes a scheduled time. The time entered by the user in the entry fields 129 and 130, on the UI screen 151 shown in FIG. 18, for entering configuration start time are set to the scheduled time in the device management information 901*a* shown in FIG. 19. The scheduled time may be any as long as the configuration start time can be known. Thus, the scheduled time may be expressed by, for example, a relative time from when the PIN code and the configuration start time are entered and the input button 126, "Set," is depressed on the UI screen 151 of FIG. 18. In other words, the scheduled time may be information indicative of a time interval, specifically, information such as one hour and two hours.

(Embodiment 3)

An embodiment 3 according to the present invention will be described. In contrast to the embodiments 1 and 2 where the premises server 103 wirelessly connect to the unconfigured devices 104 and 105 operating as APs and copies the configuration information held by the premises server 103 to the unconfigured devices 104 and 105, a premises server 103, in the embodiment 3, operates as an AP and copies connection information to unconfigured devices 104 and 105 through an existing mechanism such as WPS/AOSS.

Figure 20:
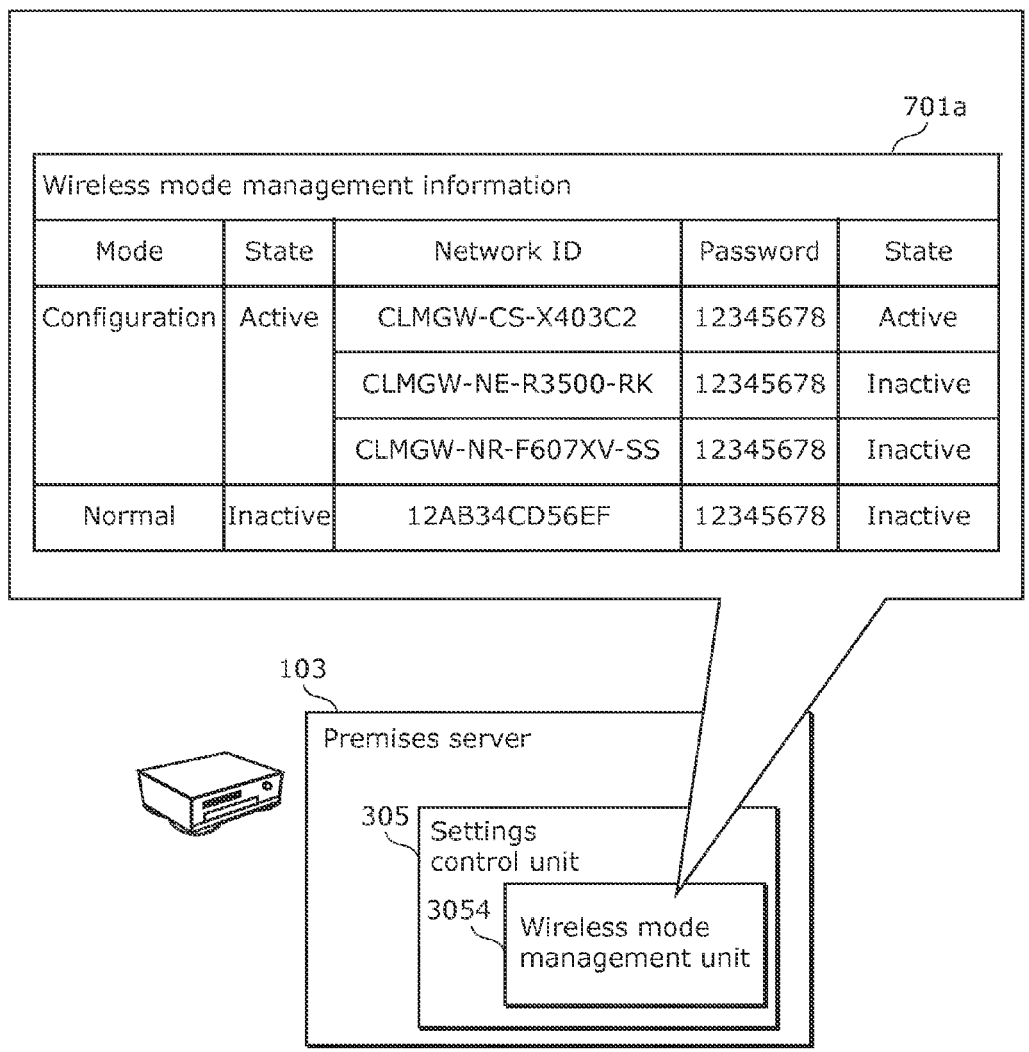
FIG. 20 is a diagram showing an example of wireless mode management information in an embodiment 3.

FIG. 20 is a diagram showing another example of the wireless mode management information.

Comparing wireless mode management information 701*a* shown in FIG. 20 with the wireless mode management information 701 shown in FIG. 7, the wireless mode management information 701*a* shown in FIG. 20 is different in that a network ID and a password in the wireless mode management information 701*a* are used by the premises server 103 to operate as an AP. In other words, prior to configuring connection settings to the premises server 103, the premises server 103 operates as an AP and notifies the unconfigured devices 104 and 105 of a network ID of the premises server 103, thereby the premises server 103 and the unconfigured devices 104 and 105 initiating WPS/AOSS to copy the configuration information to the unconfigured devices 104 and 105.

While in this example, wireless networks corresponding to one network ID can be activated concurrently, a plurality of wireless networks corresponding to a plurality of network IDs may be activated, depending on a wireless device. Moreover, although different IDs are assigned to different devices in the configuration mode, one ID may be assigned to different devices.

Figure 21:
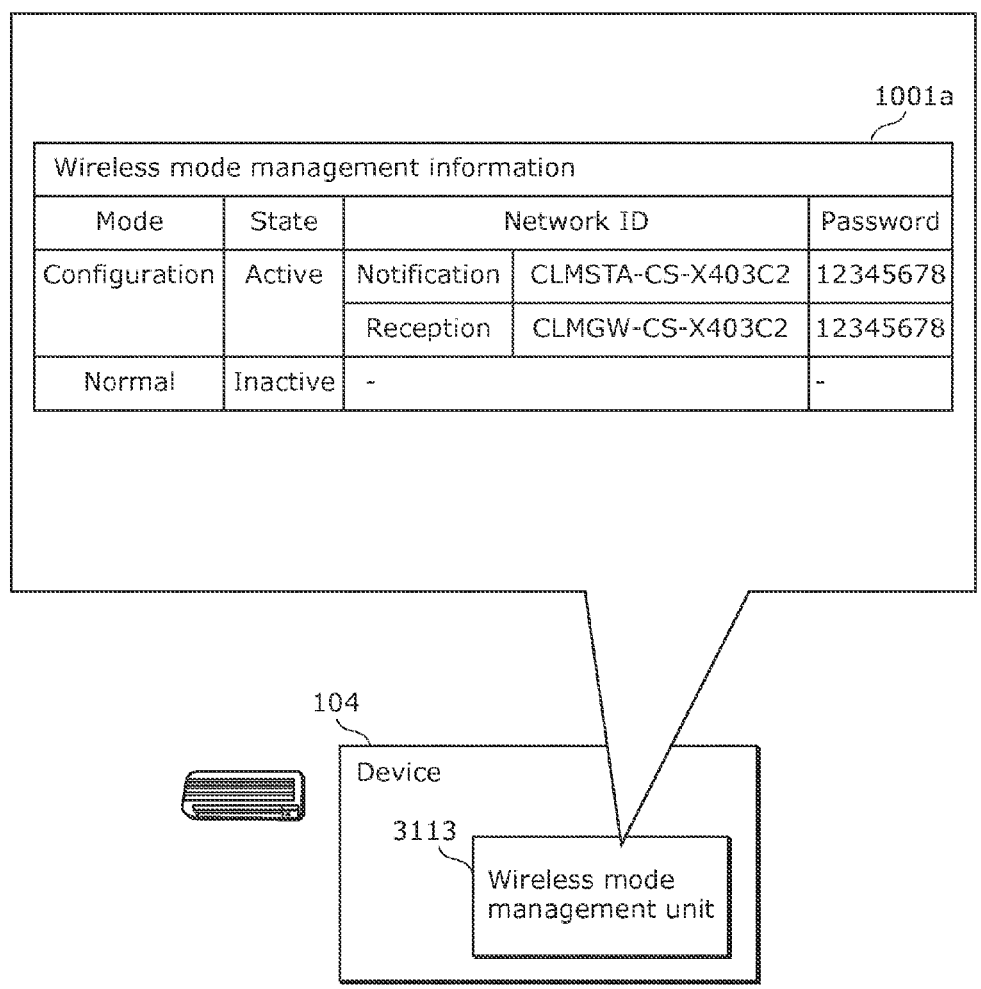
FIG. 21 is a diagram showing an example of wireless mode management information in the embodiment 3.

FIG. 21 is a diagram showing another example of the wireless mode management information.

Comparing the wireless mode management information 1001*a* shown in FIG. 21 with the wireless mode management information 1001 shown in FIG. 10, the wireless mode management information 1001*a* shown in FIG. 21 is different in that there are network IDs and passwords for notification and for reception. A network ID for notification is notified to the premises server by the device 104 operating as an AP if the device 104 is unconfigured, as with the embodiments 1 and 2. The network ID for reception is notified by the premises server and used to determine whether an unconfigured device initiates WPS/AOSS as the connection settings configuration process.

As described, the premises server operates as an AP and copies the connection information through an existing mechanism such as WPS/AOSS, thereby making the existing WPS/AOSS security mechanisms available. Thus, leakage of the configuration information can be mitigated.

(Embodiment 4)

An embodiment 4 according to the present invention will be described.

Figure 22:
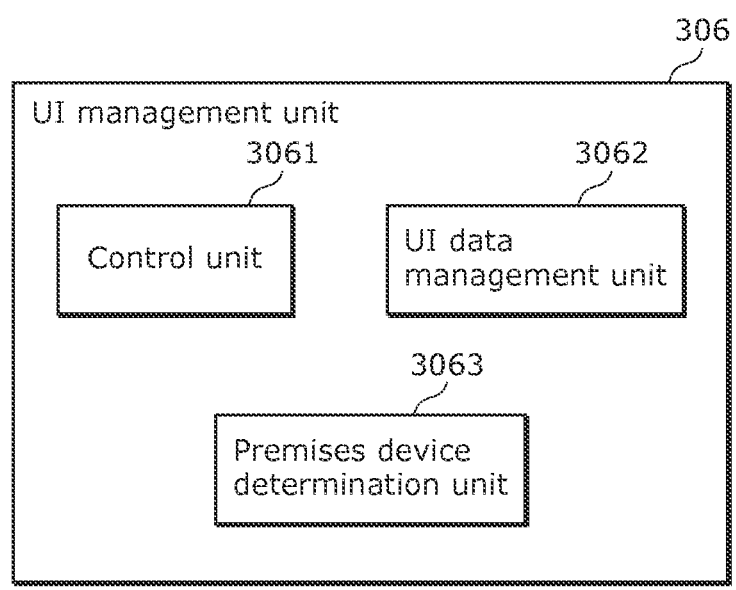
FIG. 22 is a block diagram showing an example of an internal structure of a UI management unit according to an embodiment 4.

FIG. 22 is a block diagram showing an example of an internal structure of a UI management unit 306 of the premises server 103. As shown in FIG. 22, the UI management unit 306 includes, for example, a control unit 3061, an UI data management unit 3062, and a premises device determination unit 3063.

The control unit 3061 receives instructions from a display device 102, and notifies the instructions to a settings control unit 305 or instructs the UI data management unit 3062 to generate or obtain UI data, for example.

The UI data management unit 3062, under the instructions from the control unit 3061, obtains device management information 901 from a device management unit 308 and updates the device information, or obtains, from the device management unit 308, information as to whether a device described in the device management information 901 belongs to the user using the device and updates the device information, thereby generating the UI data.

The premises device determination unit 3063, under instructions from the UI data management unit 3062, uses the device management unit 308 to determine whether the device descried in the device management information 901 belongs to the user using the device.

Here, in a screen configuration as the UI screen 120 shown in FIG. 14 of the embodiment 1, the premises server 103 indicates that the unconfigured devices are an air conditioner and a refrigerator. However, it is uncertain whether the air conditioner and the refrigerator, which are unconfigured devices, are devices (a third device) present inside or outside the user's home.

Thus, consider displaying additional information such as an indication as to whether a device displayed as an unconfigured device is inside or outside the user's home.

On a UI screen 152 shown on top of FIG. 23, an input button 133, "Show all devices," is displayed in addition to the UI screen 120 shown in FIG. 14. On the UI screen 152, the information 123 on a configured device is displayed together with that of unconfigured devices as shown on a UI screen 153 on bottom of FIG. 23 once the input button 133, "Show all devices," displayed on a touch panel 102a is selected (operated), for example.

For example, a device such as a refrigerator is there in every home.

Thus, if, for example, one refrigerator is installed in the home of the user who is operating the display device 102 and the refrigerator is already configured, the user can readily understand that a refrigerator the user is allowed to enter its PIN code is located outside his/her home.

Processing for performing the above-described displaying will be described.

First, the display device 102 transmits a get UI request to the premises server 103 and receives display information from the premises server 103. Suppose that what is displayed on the touch panel 102a based on the display information is as shown on top of FIG. 23. At this time, once the input button 133, "Show all devices," is selected (operated), a get UI request corresponding to all devices (unconfigured devices and configured devices) is transmitted to the premises server 103.

When received the get UI request mentioned above, the premises server 103 determines whether, among devices whose "Configuration state" in the device management information 901 managed by the premises server 103 is Configured, there is a device of a same model as a device whose "Configuration state" is Unconfigured. This determination may be made based on "Model name" in the UI data information 801 managed by the premises server 103.

If, for example, a refrigerator is determined to be the configured device of the same model, the premises server 103 sends information on a type and an icon of the configured device (the refrigerator in this example) to the display device 102, based on the UI data information 801 and the device management information 901. The display device 102 displays the type and icon of the configured device, in addition to those of the unconfigured devices, based on the received information. The UI screen 153 displayed on the display device 102 at this time corresponds to bottom of FIG. 23.

The processing as described above transmits to the premises server 103 the get UI request corresponding to all devices once the input button 133, "Show all devices," is selected (operated). In the foregoing, the premises server 103 sends the information on the type and the icon of the configured device (the refrigerator in this example) to the display device 102. However, the present invention is not limited thereto.

For example, the display information which the display device 102 receives in response to transmitting the get UI request to the premises server 103 may include the UI data information 801 and the device management information 901, and the display device 102 may execute a program so that the display device 102 makes the above determination. At this time, the display information transmitted to the display device 102 may include the device management information 901 having the information indicative of the PIN code removed therefrom in consideration of confidentiality since the information indicative of the PIN code in the device management information 901 included in the display information is authentication information.

For example, once an input button 134, "Return," displayed on the touch panel 102a as shown on the UI screen 153 on bottom of FIG. 23 is selected (operated) the display device 102 switches the UI screen to the UI screen 152 shown on top of FIG. 23. In switching from the UI screen 152 shown on top of FIG. 23 to, for example, the UI screen 153 shown on bottom of FIG. 23, the display device 102 may temporarily store information indicative of the UI screen 152 on top of FIG. 23 into a memory, and thereafter, retrieve and display the information stored in the memory in response to the user selecting (operating) the input button 134 "Return."

FIG. 24 is a diagram showing an example of the UI screen displayed on the touch panel 102a of the display device 102, through which a PIN code is registered.

Input buttons 135 and 136, "Details," are displayed on a UI screen 154 shown on top of FIG. 24, in addition to the fields shown on the UI screen 120 of FIG. 14. On the UI screen 154, for example, selecting (operating) the input button 135, "Details," displayed on the touch panel 102a switches the UI screen 154 to a UI screen to display detailed information 137 on a configured device which has transmitted a radio signal that has field strength close to that of a radio signal transmitted from the unconfigured device, as shown on a UI screen 155 shown on bottom of FIG. 24.

Top figure of FIG. 24 shows an example in which if the input button 135, "Details," which corresponds to the air conditioner and for which the user is allowed to enter its PIN code, is selected (operated) the detailed information 137 of a microwave oven which is a configured device that is located closest to the air conditioner, is displayed, the detailed information 137 indicating an icon of the microwave oven, date and time of purchase of the microwave oven, and the latest date and time when the microwave oven is powered on.

Processing for performing the above-described displaying will be described.

For example, the wireless communications unit 309 of the premises server 103 receives radio signals transmitted from a unconfigured device and a configured device, in response to which the wireless communications unit 309 measures the field strength of the radio signals and records the measurement into, for example, the device management information 901.

Next, when the input button 135, "Details," is selected (operated), the premises server 103 identifies field strength of an unconfigured device corresponding to the selected input button 135, "Details," from the device management information 901. Then, the premises server 103 looks for a configured device that has field strength close to the field strength of the identified device. Specifically, for example, a plurality of numerical ranges of field strength may be predetermined, and a configured device may be looked for, that has field strength covered in a numerical range covering field strength of a target unconfigured device, among the plurality of numerical range.

For example, in the example on top of FIG. 24, the input button 135, "Details," which corresponds to an unconfigured air conditioner, is selected (operated) in response to which the premises server 103 identifies field strength of a radio signal from the unconfigured air conditioner. Next, the premises server 103 identifies a numerical range covering the field strength of the radio signal from the unconfigured air conditioner, among the predetermined plurality of numerical ranges. The premises server 103 then identifies a configured device that has the field strength covered in the identified numerical range. If the premises server 103 determines that, for example, a microwave oven corresponds to the configured device, the premises server 103 obtains a power-on time of the microwave oven, and date and time of purchase of the air conditioner, for example. The power-on time of the microwave oven and the date and time of purchase of the air conditioner are obtained from the device management information 901, for example.

Alternatively, for example, the premises server 103 may look for a configured device that has field strength included in a numerical range of predetermined field strength relative to field strength of a target unconfigured device.

The premises server 103 sends the obtained information on the configured device to the display device 102, and the display device 102 displays the detailed information 137 related to the configured device located close to the target device based on the received information (bottom of FIG. 24).

This allows displaying information on a configured device located close to the target device, and if the user operating the display device 102 is aware of the spatial relationship between the target device and the configured device located close to the target device, the user can readily determine whether the target device is located inside or outside his/her home.

For example, once an input button 138, "Return," displayed on the touch panel 102*a*, as shown on the UI screen 155 on bottom of FIG. 24, is selected (operated) the display device 102 switches the UI screen to the UI screen 154 shown on top of FIG. 24. In switching from the UI screen 154 shown on top of FIG. 24 to, for example, the UI screen 155 shown on bottom of FIG. 24, the display device 102 may temporarily store information indicative of the UI screen 154 on top of FIG. 24 into a memory, and thereafter, retrieve and display the information stored in the memory in response to the user selecting (operating) the input button 138 "Return."

In the embodiment 4, in response to the user operating the UI screen 154 displayed on the touch panel 102*a* of the display device 102, the display device 102 switches to the UI screen 155 on which information indicating whether a device the user is allowed to enter its PIN code, which is the authentication information, is located inside or outside his/her home. Thus, the user of the display device 102 can readily determine whether the target device is located inside or outside his/her home, based on the indicative information.

(Embodiment 5)

An embodiment 5 according to the present invention will be described.

In the embodiment 4 described above, the description has been given where the user operates the UI screen 154 displayed on the touch panel 102*a* of the display device 102 in response to which the display device 102 switches to the UI screen 155 on which whether a target device is located inside or outside the user's home can be determined, based on the information indicating whether the target device is located inside or outside his/her home.

In the embodiment 5, whether an unconfigured device detected by a premises server 103 is located inside or outside the user's home can be actively determined.

Figure 25:
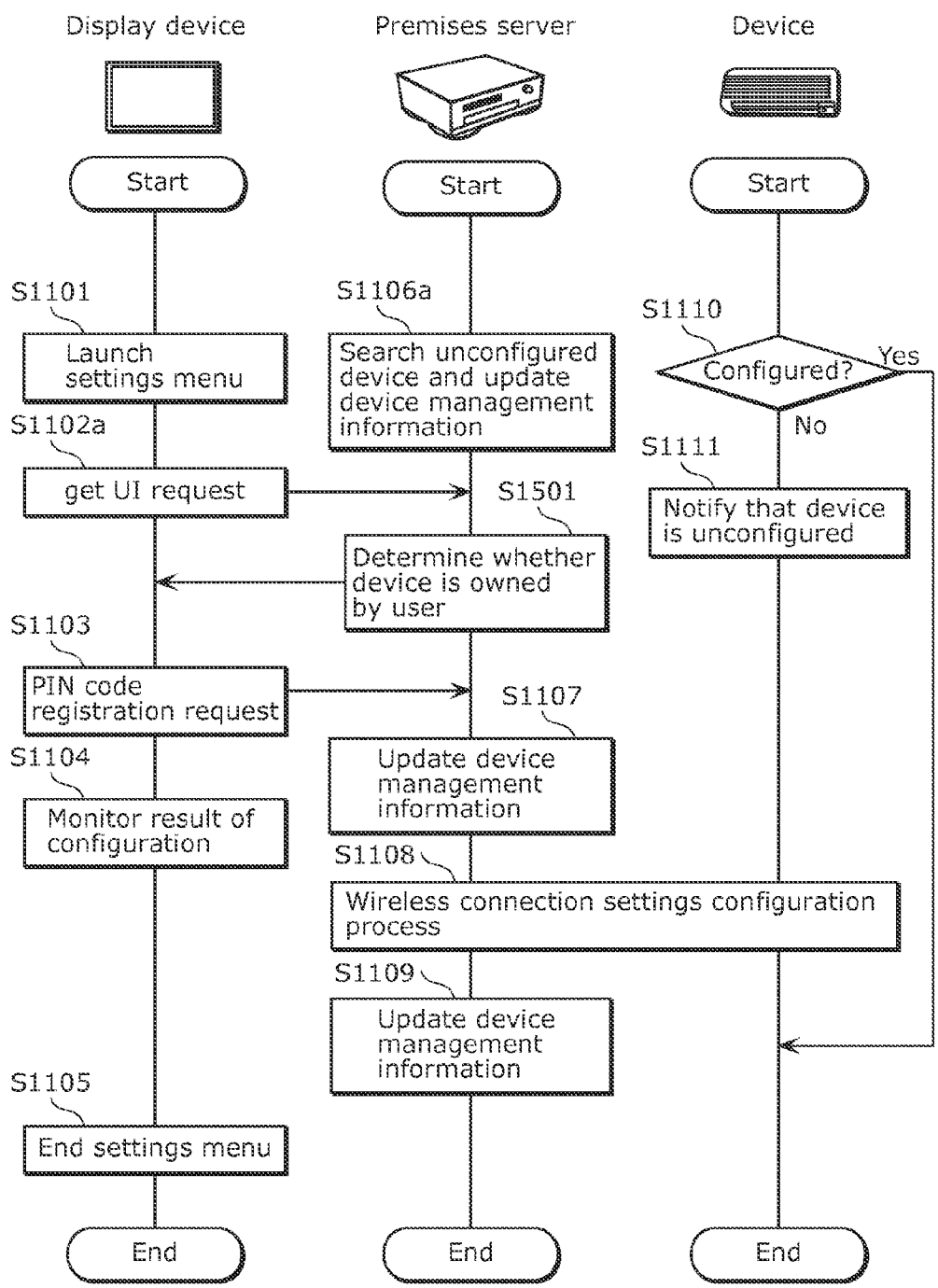
FIG. 25 is a flowchart illustrating an example of operation of a wireless connection set-up system according to an embodiment 5.

FIG. 25 is a flowchart illustrating an example of operation of a wireless connection set-up system according to the embodiment 5. In the figure, components denoted by the same reference signs as those of FIG. 12 are the same or corresponding components.

First, the flow of processing performed by a display device 102 will be described.

The user operates the display device 102 to give instructions to launch the settings menu (S1101), and an input control unit 302 sends the UI execution unit 303 information on a menu item depressed. The UI execution unit 303 causes a wireless communications unit 304 to transmit a get UI request to the premises server 103 (S1102*a*). The UI execution unit 303 obtains the display information indicative of the UI screen from the premises server 103, executes the obtained display information to send the display control unit 301 screen information obtained by executing the display information. If the user enters a PIN code of a device through the UI screen, the input control unit 302 sends information indicative of the entered PIN code to the UI execution unit 303. The UI execution unit 303 receives the information indicative of the PIN code, causes the wireless communications unit 304 to transmit the information indicative of the PIN code to the premises server 103, and request PIN registration of a device 104 using the PIN code (S1103). It should be noted that steps S1104 and S1105 are the same as those described with reference to FIG. 11 and thus the description will be omitted herein.

Next, the flow of processing performed by the premises server 103 will be described.

The premises server 103 uses a device management unit 308 to constantly search an unconfigured device and update device management information 901 managed (S1106*a*). In response to the get UI request (S1102) from the display device 102, the UI management unit 306 obtains the device management information 901 from the device management unit 308, updates the UI by adding thereto a result of determination as to whether the device is owned by the user, and uses the wireless communications unit 309 to transmit the display information indicative of the UI screen to the display device 102 (S1501).

Details of the process (S1501) of determining whether the device is owned by the user will be described, with reference to FIG. 18.

Steps S1107 through S1109 are the same as those described with reference to FIG. 12, and thus the description thereof will be omitted herein.

Moreover, steps S1110, S1111, and S1108 which are operations performed by the device 104 are the same as those descried with reference to FIG. 12 and thus the description will be omitted herein.

Figure 26:
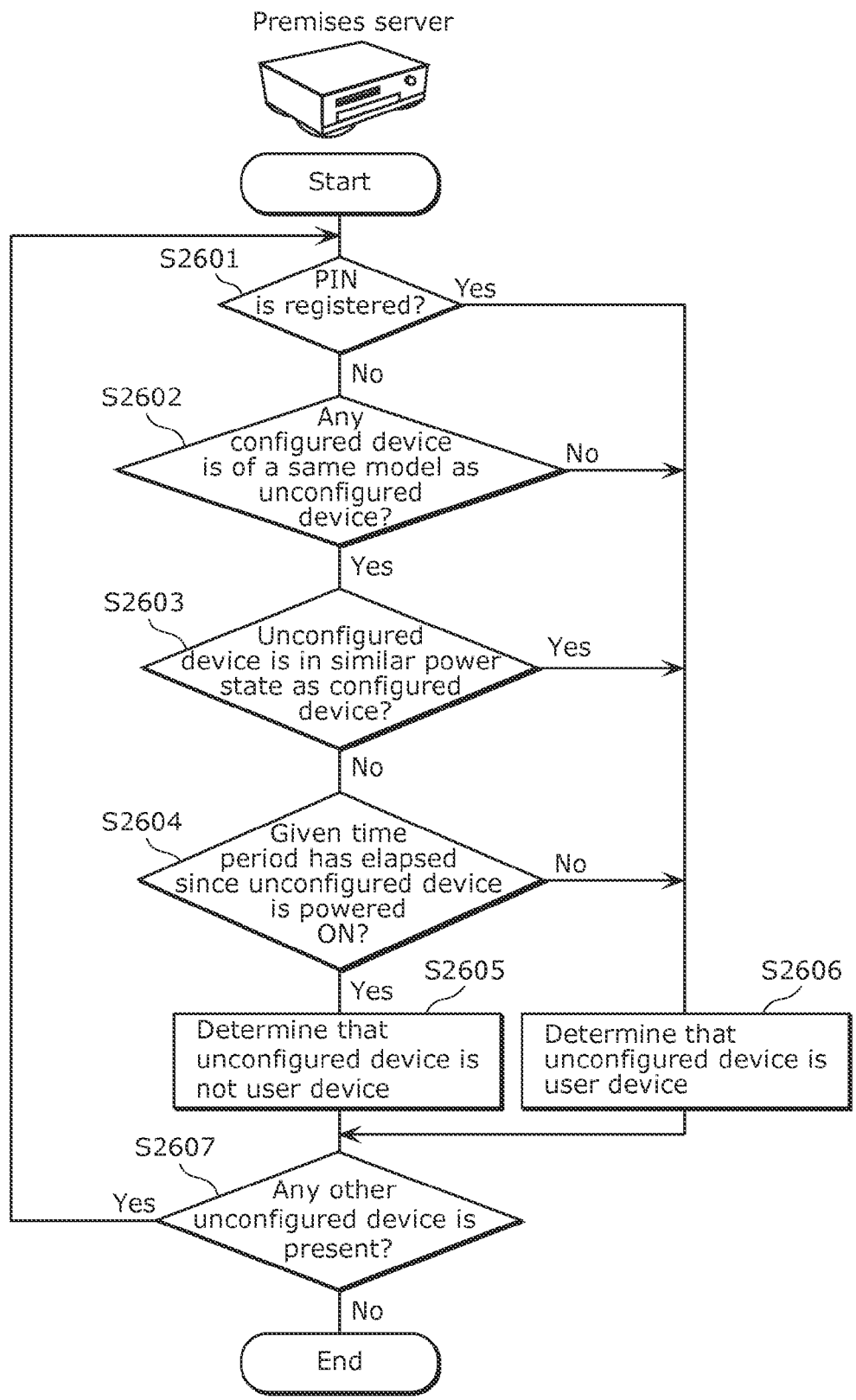
FIG. 26 is a flowchart illustrating an example of operation of a user device determination process in the embodiment 5.

FIG. 26 is a flowchart illustrating an example of the user device determination process (S1501) in FIG. 25.

A premises device determination unit 3063 obtains the device management information 901 from the device management unit 308 to determine whether PIN registration of a target unconfigured device has been made. In this case, if the PIN code of the target unconfigured device is included in an item "PIN" of the device management information 901, the premises device determination unit 3063 determines that the PIN registration of the target unconfigured device has been made, determines that the PIN registration is not made otherwise (S2601). If the PIN registration of the target unconfigured device has been made (Yes in S2601), the premises device determination unit 3063 determines that the target unconfigured device is owned by the user (S2606). If the PIN registration of the target unconfigured device is not made (No in S2601), the premises device determination unit 3063 determines whether any one of configured devices is of a same model as the target unconfigured device (S2602). If none of the configured devices is of the same model as the target unconfigured device (No in S2602), the premises device determination unit 3063 determines that the target unconfigured device is owned by the user (S2606). If any one of the configured devices is of the same type as the target unconfigured device (Yes in S2602), the premises device determination unit 3063 determines whether the timing of turning ON/OFF the power of the target unconfigured device and the timing of turning ON/OFF the power of the configured device are similar to each other (S2603). If the timing of turning ON/OFF the power of the target unconfigured device and the timing of turning ON/OFF the power of the configured device are similar to each other (Yes in S2603), the premises device determination unit 3063 determines that the target unconfigured device is owned by the user (S2606). If the timing of turning ON/OFF the power of the target unconfigured device and the timing of turning ON/OFF the power of the configured device are not similar to each other (No in S2603), the premises device determination unit 3063 determines whether a given time period has elapsed since the target unconfigured device is powered ON (S2604). If the given time period has not elapsed since the target unconfigured device is powered ON (No in S2604), the premises device determination unit 3063 determines that the target unconfigured device is owned by the user (S2606). If the given time period has elapsed since the target unconfigured device is powered ON (Yes in S2604), the premises device determination unit 3063 determines that the target unconfigured device is not owned by the user (S2605).

The premises device determination unit 3063, thereafter, determines whether any other unconfigured device is present (S2607). If any other target unconfigured device is present (Yes in S2607), the premises device determination unit 3063 repeats the processing, starting from step S2601.

In the above example, the target unconfigured device is assumed being powered ON in step S2604. If the target unconfigured device is powered OFF, however, the processing may proceed to step S2607 since the determination of S2604 cannot be made.

Figure 27:
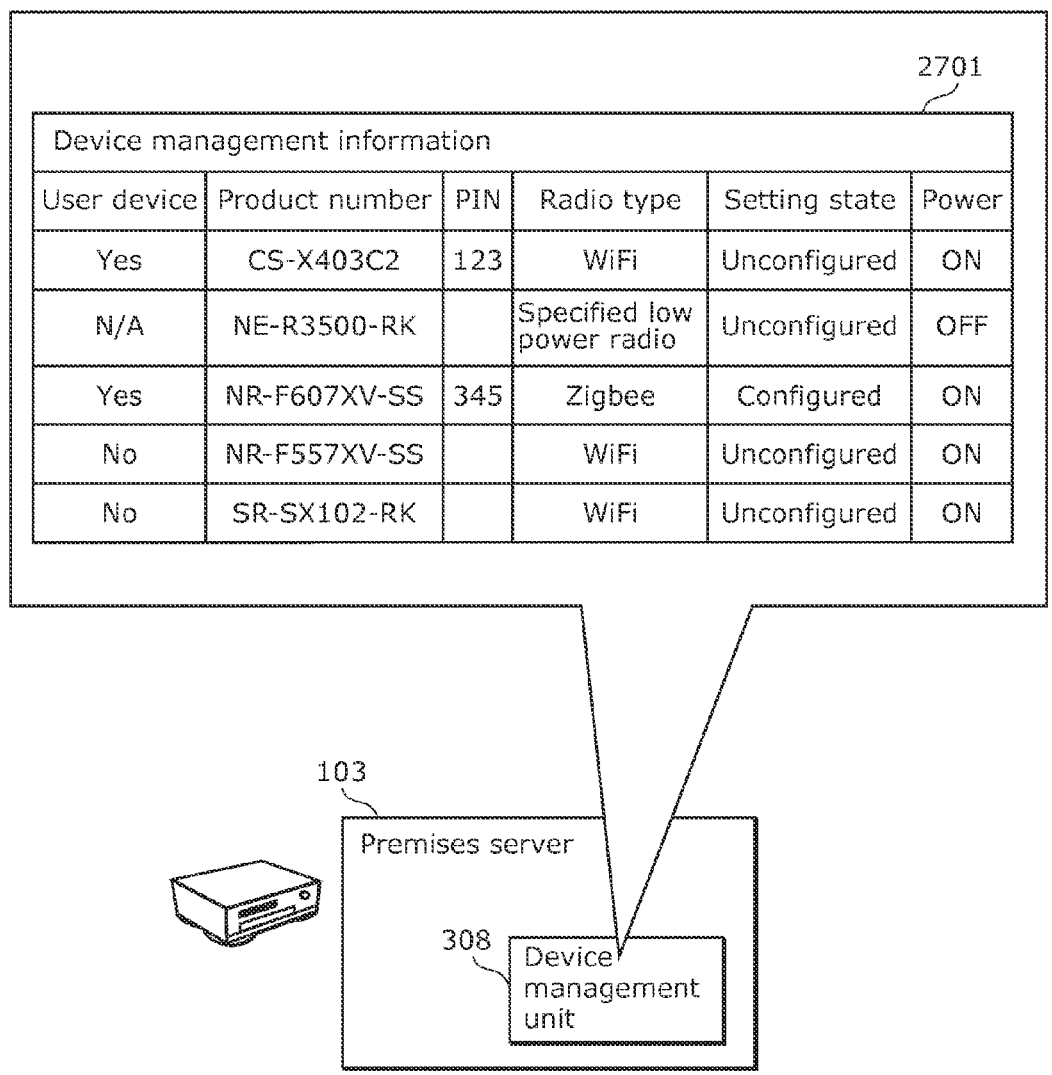
FIG. 27 is a diagram showing an example of device management information in the embodiment 5.

FIG. 27 is another diagram showing an example of the device management information.

Device management information 2701 shown in FIG. 27 is different from the device management information 901 shown in FIG. 9 in that the device management information 2701 further includes information ("User device" field) as to whether a target unconfigured device is a user device. A result of the device determination process of step S1501 is indicated in "User device" field in the device management information 2701 of FIG. 27.

In "User device" field in the device management information 2701 shown in FIG. 27, "Yes" indicates that a corresponding device is determined to be owned by the user (i.e., a device located inside the user's home) as a result of the device determination process of S1501. "No" indicates that a corresponding device is determined to not be owned by the user (i.e., a device located outside the user's home) as a result of the process of S1501. "N/A" indicates that the determination in step S2604 cannot be made due to a fact that, for example, a target device is powered OFF as a result of the process of S1501, ending up being unable to determine whether the target device is owned by the user or not.

FIG. 28 is a diagram showing another example of a UI screen at the time of PIN registration.

Information 121a indicative of a type, a product number, an icon, and whether a PIN is registered is indicated on a UI screen 156 shown in (a) of FIG. 28, with respect to devices whose information in "User device" indicates "Yes" or "N/A", among the devices whose "Configuration state" is Unconfigured in the device management information 2701 shown in FIG. 27.

If a PIN code is not registered yet, an entry field 125 for entering the PIN code is displayed in a square next to a text "PIN."

The information on devices whose information indicated in "User device" is "Yes" and "N/A" are displayed on the UI screen 156 shown in (a) of FIG. 28 among the devices whose "Configuration state" is Unconfigured. However, devices corresponding to "N/A" may not be displayed.

Such a configuration can be used to eliminate display of devices determined to be located outside the user's home, thereby allowing the user to readily identify premises devices.

Moreover, among the devices whose "Configuration state" is Unconfigured, devices whose information indicated in "User device" is "No" (i.e., devices determined to be located inside the user's home) are not displayed on the UI screen 156. This can prevent the user from inadvertently entering a PIN code of a device that is determined to be located outside his/her home.

On a UI screen 157 shown in (b) of FIG. 28, among the devices whose "Configuration state" is Unconfigured, devices whose information indicated in "User device" is "No" (i.e., the devices determined to be located outside the user's home) are displayed in a different mode from those whose information indicated in "User device" is "Yes" (i.e., devices determined to be located inside the user's home). In the example of (b) of FIG. 28, for example, a device whose information indicated in "User device" is "No" is a refrigerator and a region 139 displaying information on the refrigerator (a region for entering an icon, a product number, and a PIN code) is shown in a different color from colors used for the other regions.

This allows the user to visually distinguish between devices inside his/her home and those outside the home. The region for entering a PIN code corresponding to a device whose information indicated in "User device" is "No" (the refrigerators in this example) may not be displayed in (b) of FIG. 28. In this case, an inadvertent entry of a PIN for the device determined to be located outside the user's home can be prevented.

Allowing the user to distinguish neighbor's devices (i.e., the devices located outside the user's home) in such a manner allows the user to identify his/her own device.

(Variation)

While the present invention has been described, with reference to the above embodiments, it will be appreciated that the present invention is not limited to the above embodiments.

The present invention may be implemented in a computer program storing a program code for operating a computer, or may be implemented in a digital signal including the computer program.

Moreover, the present invention may be a computer-readable recording medium storing the computer program or the digital signal, such as a flexible disk, a hard disk, CD-ROM, MO, DVD, DVD-ROM, DVD-RAM, BD (Blu-ray (registered trademark) Disc), and a semiconductor memory.

Moreover, the present invention may be achieved in transmitting the computer program or the digital signal via an electric communication line, a wireless or wired communication line, a network represented by the Internet, etc.

Moreover, by transferring the computer program or the digital signal stored in the recording medium or transferring the computer program or the digital signal via the network, etc., the computer program or the digital signal may be executed in any other independent computer system.

The present invention can be implemented in an LSI which controls the wireless communications apparatus according to the above embodiments. The functional blocks of the wireless communications apparatus may separately be mounted on one chip, or a part or the whole of the functional blocks may be mounted on one chip.

Here, the term, LSI, is used. However, IC, system LSI, super LSI, ultra LSI may be used depending on a difference in degree of integration.

Moreover, the circuit integration is not limited to the LSI and may be implemented in a dedicated circuit or in a general-purpose processor. A field programmable gate array (FPGA) that can be programmed after manufacturing the LSI or a reconfigurable processor that allows re-configuration of the connection or configuration of the LSI can be used for the same purpose.

Furthermore, if circuit integration technology emerges replacing the LSI owning to advance in semiconductor technology or other technology derived therefrom, the functional blocks and components may, of course, be integrated through the technology. For example, application of biotechnology is possible.

In the above embodiments, a recording medium (e.g., a semiconductor memory such as a HDD, an SD card, and a compact flash (registered trademark)) is used as a readable/writable recording medium to which data-at-rest is transferred. However, the characteristics of the present invention do not depend on physical properties of the recording medium, and the present invention is applicable to any other readable/writable recording media. For example, the same effects as described above can, of course, be produced also when an external hard disk drive is used to store the data, for example.

The above-described embodiments and variations thereof may be combined.

INDUSTRIAL APPLICABILITY

The present invention is applicable to wireless communications apparatuses equipped with wireless capabilities.

REFERENCE SIGNS LIST

101 Cloud (premises server)
102 Display device
102*a* Touch panel
103 Premises server
104, 105, 106 Device
110, 120, 140, 151, 152, 153, 154, 155, 156 UI screen
111, 112, 121, 122, 131 Icon
113, 114, 124, 125, 129, 130, 132, 141, 142 Entry field
121*a*, 123, 127, 128 Information
115, 126, 133, 134, 135, 136, 138, 143 Input button
137 Detailed information
139 Region
201 Configuration information
202 Configuration information
203, 204, 205 PIN code
301 Display control unit
302 Input control unit
303 UI execution unit
304 Wireless communications unit
305 Settings control unit
306 UI management unit
307 Wireless control unit
308 Device management unit
309 Wireless communications unit
310 Input control unit
311 Setting state management unit
312 Authentication information management unit
313 Wireless control unit
314 Wireless communications unit
601 Configuration information
701, 701*a*, 1001, 1001*a* Wireless mode management info ration
801 UI data information
901, 901*a*, 2701 Device management information
3051 Settings determination unit
3052 Configuration information management unit
3053 Wireless mode management unit
3061 Control unit
3062 UI data management unit
3063 Premises device determination unit
3111 State determination unit
3112 Configuration information management unit
3113 Wireless mode management unit

The invention claimed is:

1. A method for configuring wireless connection settings, executed by a wireless communications apparatus to establish a wireless connection between a device and the wireless communications apparatus, the method comprising:

(a) receiving a first radio signal transmitted from a first device which does not retain first configuration information for establishing a wireless connection with the wireless communications apparatus, the first radio signal including second configuration information for establishing a wireless connection with the first device;

(b) receiving authentication information for use in authenticating the first device from a second device retaining the first configuration information, the authentication information being uniquely associated with the first device;

(c) retaining the authentication information associated with the first device and received in step (b);

(d) establishing the wireless connection with the first device, using the second configuration information included in the first radio signal received in step (a);

(e) transmitting a second radio signal which includes the authentication information, to the first device through the wireless connection established in step (d);

(f) receiving, from the first device through the wireless connection established in step (d), a third radio signal which includes response information to the authentication information included in the second radio signal transmitted in step (e); and (g) transmitting the first configuration information to the first device through the wireless connection established in step (d) if the response information indicates that the first device has been successfully authenticated.

2. The method according to claim 1, wherein
the wireless communications apparatus retains the first configuration information, and third configuration information for establishing the wireless connection with the wireless communications apparatus by a second wireless communications method different from a first wireless communications method for use in establishing the wireless connection with the wireless communications apparatus using the first configuration information, the method further comprising
(h) identifying, from among the first wireless communications method and the second wireless communications method, a wireless communications method used for the first radio signal received from the first device, wherein
in step (d), the wireless connection with the first device is established by the wireless communications method identified in step (h),
in step (e), the second radio signal is transmitted to the first device by the wireless communications method identified in step (h), and
in step (g), one of the first configuration information and the third configuration information that corresponds to the wireless communications method identified in step (h) is transmitted to the first device if the response information indicates that the first device has been successfully authenticated.

3. The method according to claim 2, wherein
if the response information indicates that the first device has been successfully authenticated, among plural pieces of the first configuration information retained by the wireless communications apparatus, first configuration information that corresponds to the wireless communications method identified in step (h) and is identical in content to first configuration information that is retained by a host wireless communications apparatus of the wireless communications apparatus is transmitted to the first device.

4. The method according to claim 1, wherein
the second device includes an input unit configured to receive input including the authentication information from a user, and a display unit, and
in step (b), the authentication information included in the input received by the input unit is received.

5. The method according to claim 4, further comprising
(i) transmitting, to the second device, display information for displaying a user interface (UI) screen on the display unit of the second device, wherein
the authentication information is input via the UI screen displayed on the display unit of the second device.

6. The method according to claim 5, wherein
the first radio signal received in step (a) further includes device specific information identifying the first device,
the method further comprising:
(j) obtaining relevant information related to the device specific information from a server; and
(k) retaining the device specific information and the relevant information obtained in step (j) in the wireless communications apparatus, wherein in step (i), information including the device specific information and the relevant information is transmitted as the display information to the second device.

7. The method according to claim 1, wherein
step (b) further includes receiving time information related to a scheduled time at which the first device is to be authenticated, and
in step (d), based on the time information, the wireless connection with the first device is established using the second configuration information provided by the first device and corresponding to the time information.

8. The method according to claim 1, further comprising
(l) detecting whether the first device is wirelessly connecting to the wireless communications apparatus using the first configuration information provided by the wireless communications apparatus, wherein
if the first device is detected to not be wirelessly connecting to the wireless communications apparatus using the first configuration information in step (1), the wireless communications apparatus switches to a state where the wireless communications apparatus is allowed to wirelessly connect to the first device using the second configuration information provided by the first device.

9. The method according to claim 5, wherein
step (a) further includes receiving a fourth radio signal from a third device which is in a home and retains the first configuration information, wherein
if input is made, via the UI screen, to request for information which is an indication for determining whether the first device is located inside or outside the home while the UI screen is being displayed on the display unit of the second device, a UI screen which includes information on the third device satisfying predetermined conditions is displayed on the display unit of the second device.

10. The method according to claim 9, wherein
the wireless communications apparatus retains information on the third device and information on the first device,
the information on the third device and the information on the first device include model information of the third device and model information of the first device, respectively, and
the predetermined conditions include the third device being of a same model as the first device.

11. The method according to claim 9, wherein
the wireless communications apparatus retains information on the third device and information on the first device,
the information on the third device and the information on the first device include information on field strength of a radio signal transmitted from the third device and information on field strength of a radio signal transmitted from the first device, respectively, and
the predetermined conditions include the third device having field strength comparable to field strength of the first radio signal transmitted from the first device.

12. The method according to claim 5, further comprising
(m) determining whether the first device is located inside or outside a home, wherein
in step (i), information for displaying information on the first device determined to be located outside the home in step (m) differently from the first device determined to be located inside the home in step (m), is transmitted as the display information.

13. The method according to claim 12, wherein
in step (m), the first device is determined to be located inside the home if the first device retains authentication information corresponding to the wireless communications apparatus.

14. The method according to claim 12, wherein
in step (m), the first device is determined to be located inside the home if a model of the first device is different from a model of the third device.

15. The method according to claim 12, wherein
in step (m), the first device is determined to be located inside the home if a time slot during which the first device is being powered on is similar to a time slot during which the third device is being powered on.

16. The method according to claim 12, wherein
in step (m), the first device is determined to be located inside the home if a predetermined time period has not elapsed since the first device is powered on.

17. A wireless communications apparatus comprising:
a processor; and
a non-transitory memory having stored thereon executable instructions, which when executed, cause the processor to perform:
  (a) receiving a first radio signal transmitted from a first device which does not retain first configuration information for establishing a wireless connection with the wireless communications apparatus, the first radio signal including second configuration information for establishing a wireless connection with the first device;
  (b) receiving authentication information for use in authenticating the first device from a second device retaining the first configuration information, the authentication information being uniquely associated with the first device;
  (c) retaining the authentication information associated with the first device and received in step (b);
  (d) establishing the wireless connection with the first device, using the second configuration information included in the first radio signal received in step (a);
  (e) transmitting a second radio signal which includes the authentication information, to the first device through the wireless connection established in step (d);
  (f) receiving, from the first device through the wireless connection established in step (d), a third radio signal which includes response information to the authentication information included in the second radio signal transmitted in step (e); and
  (g) transmitting the first configuration information to the first device through the wireless connection established in step (d) if the response information indicates that the first device has been successfully authenticated.

* * * * *